United States Patent
Venancio

(10) Patent No.: US 11,592,392 B2
(45) Date of Patent: Feb. 28, 2023

(54) WAVE FRONT RECONSTRUCTION FOR DIELECTRIC COATINGS AT ARBITRARY WAVELENGTH

(71) Applicant: European Space Agency, Paris (FR)

(72) Inventor: Luis Miguel Gaspar Venancio, Noordwijk (NL)

(73) Assignee: European Space Agency, Paris (FR)

( * ) Notice: Subject to any disclaimer, the term of this patent is extended or adjusted under 35 U.S.C. 154(b) by 174 days.

(21) Appl. No.: 16/956,484

(22) PCT Filed: Dec. 22, 2017

(86) PCT No.: PCT/EP2017/084363
§ 371 (c)(1),
(2) Date: Jun. 19, 2020

(87) PCT Pub. No.: WO2019/120561
PCT Pub. Date: Jun. 27, 2019

(65) Prior Publication Data
US 2020/0348228 A1     Nov. 5, 2020

(51) Int. Cl.
*G01N 21/41*      (2006.01)
*G01M 11/02*      (2006.01)
(Continued)

(52) U.S. Cl.
CPC ............ *G01N 21/41* (2013.01); *G01M 11/02* (2013.01); *G01N 21/8422* (2013.01); *G02B 1/10* (2013.01); *G01N 2021/4173* (2013.01)

(58) Field of Classification Search
CPC ............... G01N 21/8422; G01N 21/41; G01N 2021/4173; G02B 1/10; G01M 11/02
See application file for complete search history.

(56) References Cited

U.S. PATENT DOCUMENTS 8,400,631 B2    3/2013  Piombini
9,172,208 B1 *  10/2015 Dawson ................. H01S 3/302
(Continued)

FOREIGN PATENT DOCUMENTS

FR       2 941 780 A1    8/2010

OTHER PUBLICATIONS

Written Opinion and International Search Report for Application No. PCT/EP2017/084363 dated Dec. 5, 2018, 20 pages.
(Continued)

*Primary Examiner* — Sang H Nguyen
(74) *Attorney, Agent, or Firm* — Seed Intellectual Property Law Group LLP

(57) ABSTRACT

A method of determining a phase shift caused by reflection at, or transmission through, a dielectric coating as a function of wavenumber includes obtaining a nominal phase shift for the dielectric coating as a function of wavenumber, determining a first wavenumber and a second wavenumber for performing measurements of phase shift at these wavenumbers based on the nominal phase shift, determining a wavenumber shift based on a first measurement of phase shift at the first wavenumber, a second measurement of phase shift at the second wavenumber, and the nominal phase shift as a function of wavenumber, and determining the phase shift as a function of wavenumber based on the wavenumber shift and the nominal phase. Further described is a method of determining a layer design for a dielectric coating, wherein the dielectric coating comprises a plurality of stacked layers.

20 Claims, 18 Drawing Sheets

(51) Int. Cl.
*G02B 1/10* (2015.01)
*G01N 21/84* (2006.01)

(56) References Cited

U.S. PATENT DOCUMENTS

| | | | |
|---|---|---|---|
| 10,883,799 B1* | 1/2021 | Ni | F41H 3/02 |
| 2005/0219536 A1* | 10/2005 | Feldman | G01J 9/00 356/419 |
| 2010/0093260 A1* | 4/2010 | Kobayashi | B24B 49/12 451/6 |
| 2010/0315632 A1 | 12/2010 | Brennan, III | |
| 2015/0043049 A1* | 2/2015 | Takahashi | G02B 21/10 359/385 |
| 2015/0263425 A1* | 9/2015 | Gillard | H01Q 15/0013 342/6 |
| 2016/0004221 A1* | 1/2016 | Ayres | G03H 1/2645 359/30 |
| 2016/0294054 A1* | 10/2016 | Behdad | H01Q 21/061 |

OTHER PUBLICATIONS

Strojnik, M., "Effect of the coating-thickness error on the performance of an optical component", Proceedings of SPIE, vol. 2553, Sep. 29, 1995, XP055498297, pp. 557-565.

Piombini, H., "Estimation of phase shifts linked only to the coating for a dielectric mirror", Applied Optics, vol. 50, No. 9, Mar. 20, 2011, XP001561391, pages C441-C448.

Born, M. et al., "Wave Propagation in a Stratified Medium. Theory of Dielectric Films", Principles of Optics, 6$^{th}$ ed., Jan. 1, 1980, XP055499073, pp. 51-70.

Abeles, F., "Recherches Sur La Propagation Des Ondes Électromagnétiques Sinusoïdales Dans Les Milieux Stratifiés. Application Aux Couches Minces", Annales de physique, vol. 12, No. 5, 1950, pp. 596-640 w/ machine translation of title and abstract, 49 pages.

Baumeister, P.W. et al., "Characteristics of the Phase-Dispersion Interference Filter", Journal of the Optical Society of America, vol. 49, No. 12, Dec. 1959, p. 1188-1190.

Mouchart, J., "Thin film optical coatings: 1. Optical coating stabilities", Applied Optics, vol. 16, No. 9, Sep. 1977, pp. 2486-2490.

Lichten, W., "Precise wavelength measurements and optical phase shifts", Optical Society of America, 1985, p. 1869-1876.

Furman, Sh.A. et al., "Basics of Optics of Multilayer Systems", Edition Frontieres, 1992, 129 pgs.

Tikhonravov, A. V., "Some theoretical aspects of thin-film optics and their applications", Applied Optics, vol. 32, No. 28, Oct. 1, 1993, pp. 5417-5426.

Tikhonravov, A. V. et al., "Phase properties of multilayers", Applied Optics, vol. 36, No. 19, Jul. 1, 1997, p. 4382-4392.

Oreb, B.F. et al., "Characterization of wavefront variations in coated optics", Proceedings of SPIE, vol. 3782, 1999, pp. 232-243.

Born, M. et al., "Principles of Optics", Cambridge University Press, 1999, 7$^{th}$, pp. 54-74.

Baumeister, P.W., "Optical coating technology", Washington, SPIE, 2004, 839 pages.

Amotchkina et al., "Structural Properties of Antireflection Coatings", Optical Society of America, 2007, 3 pgs.

Amotchkina et al., "Quality control of oblique incidence optical coatings based on normal incidence measurement data", Optics Express, 18: vol. 21, 2013, 15 pgs.

European Office Action for European Application No. 17 825 537.8, dated May 12, 2022, 4 pgs.

\* cited by examiner

WAVE FRONT RECONSTRUCTION FOR DIELECTRIC COATINGS AT ARBITRARY WAVELENGTH

TECHNICAL FIELD

This application relates to methods, processes, and apparatus for reconstruction of the wave front reflected/transmitted by dielectric coatings at an arbitrary wavelength and for designing dielectric coatings robust to thickness errors. In particular, the application relates to a method of determining a phase shift caused by reflection at, or transmission through, a dielectric coating as a function of wavenumber and to a method of determining a layer design for a dielectric coating, and to corresponding apparatus.

BACKGROUND

Dielectric coatings are commonly used in many optical systems and optical instruments. These dielectric coatings have a significant wavelength-dependent contribution to the overall image quality budget. Although it has been known since the 1950's that dielectric coatings, by design, will introduce wavelength-dependent phase shifts to incoming wave fronts, this issue has to the inventor's knowledge not been addressed in the scientific literature.

In particular, the phase shift in reflection and transmission may depart from the as-designed phase shift due to manufacturing errors, and it may even be the case that structures are imprinted on the dielectric coating's reflected/transmitted wave front during the coating manufacturing process. The impact on the performance of the optical system including dielectric coatings may or may not be catastrophic depending on the robustness of the coatings design against manufacturing errors and on the design itself.

In several highly demanding applications (such as weak lensing astronomy, e.g., Euclid, gravitational wave detection, e.g., LISA, LIGO/VIRGO, polarization microscopy, earth observation missions, interferometry for spectrometry, etc.), an accurate knowledge of the phase of the light after reflection/transmission is necessary. However, the accurate phase is often impossible to assess unambiguously, thus leading to extremely stringent requirements on the manufacturing accuracy of the dielectric coatings, or to comparatively large error budgets.

Known techniques for determining the phase of light after reflection/transmission by a dielectric coating include ellipsometry and spectral reflectance/transmittance. The former technique necessitates a priori knowledge of the exact design of the dielectric coating and access to a wavelength scanning ellipsometer. The latter technique is based on Kramers-Kronig relations. It again requires a priori knowledge of the exact design of the dielectric coating and moreover provides non-unique solutions leading to ambiguities on the actual phase shift of the dielectric coating.

Details of the coating design are often retained by the coating manufacturer as part of their intellectual property. However, both the aforementioned techniques are unusable if the exact design of the dielectric coating is unknown. Moreover, both techniques are rather cumbersome to implement.

Thus, there is a need for methods and corresponding apparatus for determining a phase shift caused by reflection at, or transmission through, a dielectric coating as a function of wavenumber. There is further need for such methods that require minimal knowledge of the design (e.g., layer design) of the dielectric coating. There is yet further need for methods for determining a layer design for a dielectric coating that improve robustness of the as-designed phase shift in the presence of deviations from the layer design during manufacturing.

SUMMARY

In view of this need, the present document proposes a method of determining a phase shift caused by reflection at, or transmission through, a dielectric coating as a function of wavenumber, a method of determining a layer design for a dielectric coating, wherein the dielectric coating comprises a plurality of stacked layers, corresponding apparatus, and corresponding computer-readable storage media, having the features of the respective independent claims.

An aspect of the disclosure relates to a method of determining a phase shift caused by reflection at, or transmission through, a dielectric coating as a function of wavenumber. The method may include obtaining a nominal phase shift ($\phi_c(k)$) for the dielectric coating as a function of wavenumber. The nominal phase shift may be provided by a manufacturer of the dielectric coating, for example. The nominal phase shift may be given for normal incidence or may be given for plurality of directions of incidence. The method may further include determining a first wavenumber and a second wavenumber for performing measurements of phase shift at these wavenumbers, based on the nominal phase shift. The method may further include determining a wavenumber shift based on a first measurement of phase shift at the first wavenumber, a second measurement of phase shift at the second wavenumber, and the nominal phase shift as a function of wavenumber. The wavenumber shift may emulate a phase shift resulting from thickness variations in the dielectric coating. The method may yet further include determining the phase shift ($\phi_r(k)$ or $\phi_t(k)$) as a function of wavenumber based on the wavenumber shift and the nominal phase shift. The phase shift may relate to a wave front error (WFE). The determined phase shift may be an actual, or as-manufactured, phase shift of the dielectric coating. The phase shift as a function of wavenumber may include a first portion ($\phi'_c(k)$) resulting from thickness variations in the dielectric coating and a second portion ($\phi_s(k)$) resulting from local deformation of the dielectric coating due to substrate deformation.

Configured as such, the proposed method allows one to infer the phase shift that is applied by an as-manufactured dielectric coating (e.g., coating stack) to a wave front in reflection or transmission. Only minimal knowledge of the coating design and wave front measurements at two suitably chosen wavelengths are necessary for achieving this aim. Thus, the as-manufactured phase shift can be determined even if details of the coating stack are unknown (e.g., since they are retained by the manufacturer of the coating as part of their intellectual property). Thereby, the accuracy of wave front measurements can be improved by taking into account the actual phase shift that is induced by the as-manufactured dielectric coating, instead of only considering the as-designed phase shift. Notably, the proposed method can be applied to any optical instrument or application that employs dielectric coatings.

In some embodiments, the method may further include determining an estimate of the wavenumber shift based on a simulation of a deviation of the dielectric coating from an as-designed configuration thereof. The simulation may involve perturbing the as-designed configuration of the dielectric coating. Then, determining the first wavenumber and the second wavenumber may be further based on the estimate of the wavenumber shift. In some embodiments, the wavenumber shift may be determined iteratively.

In some embodiments, the method may further include determining a first contribution to the phase shift as a function of wavenumber, the first contribution depending on thickness variations of stacked layers of the dielectric coating from their respective nominal thickness. The method may yet further include determining a second contribution to the phase shift as a function of wavenumber, the second contribution depending on local deformation of the dielectric coating due to substrate deformation. Then, the phase shift as a function of wavenumber may be determined based on the first contribution and the second contribution. For example, the phase shift as a function of wavenumber may be based on a sum of the first contribution and the second contribution.

In some embodiments, the method may further include determining the first contribution by shifting the nominal phase shift as a function of wavenumber by the wavenumber shift, such that the first contribution, at a given wavenumber, is given by the nominal phase shift at a shifted wavenumber that is obtained by shifting the given wavenumber by the wavenumber shift. In other words, the first contribution $\phi'_c(k)$ may be given by $\phi'_c(k) = \phi_c(k+\delta k)$, where $\phi_c(k)$ is the nominal phase shift and k is the wavenumber shift.

In some embodiments, the method may further include determining a total optical path difference that is caused by local deformation of the dielectric coating based on the first measurement of phase shift at the first wavenumber, the second measurement of phase shift at the second wavenumber, and the nominal phase shift. Then, the phase shift as a function of wavenumber may be determined further based on the total optical path difference. Determining the second contribution may involve obtaining a product of the total optical path difference and the wavenumber. Thereby, the proposed method can also account for irregularities of the substrate on which the dielectric coating is provided.

In some embodiments, the first and second wavenumbers may be determined such that they satisfy $$\frac{R(k_1)}{k_1} = \frac{R(k_2)}{k_2},$$

where $k_1$ and $k_2$ are the first and second wavenumbers, respectively, and R(k) includes higher order terms of second order or higher of the Taylor expansion of the nominal phase shift at wavenumber k. Using such wavenumbers ensures high accuracy of the determined phase shift.

In some embodiments, the wavenumber shift may be determined as $$\delta k = \frac{k_2 \cdot k_1 \cdot (OPD_2 - OPD_1) - (k_1 \cdot \phi_c(k_2) - k_2 \cdot \phi_c(k_1))}{k_1 \cdot \frac{d\phi_c}{dk}(k_2) - k_2 \cdot \frac{d\phi_c}{dk}(k_1)},$$

where $\delta_k$ is the wavenumber shift, $k_1$ and $k_2$ are the first and second wavenumbers, respectively, $OPD_1$ and $OPD_2$ are optical path differences obtained in the first and second measurements, respectively, and $\phi_c(k)$ is the nominal phase shift as a function of wavenumber.

In some embodiments, the steps of determining the wavenumber shift and determining the phase shift as a function of wavenumber may be performed for each of a plurality of points on a surface of the dielectric coating. Thereby, a map of the phase shift across the surface or part of the surface of the dielectric coating may be obtained. Further, the steps of determining the wavenumber shift and determining the phase shift as a function of wavenumber may be performed for each of a plurality of angles of incidence at the dielectric coating.

In some embodiments, the method may further include determining a phase shift at a third wavenumber that is different from both the first and second wavenumbers, based on the phase shift as a function of wavenumber and the third wavenumber. Since the proposed method provides the phase shift as a function of wavenumber, the phase shift (and thus the deformation of the wave front) can be calculated for any arbitrary wavenumber of interest.

In some embodiments, the method may further include obtaining a measured wave front after reflection by, or transmission through, the dielectric coating at the third wavenumber. Then, the method may yet further include determining a final output indicative of or depending on the measured wave front, based on the determined phase shift at the third wavenumber. This may involve calibrating the measurement based on the determined phase shift at the third wavenumber, correcting the measured wave front based on the determined phase shift at the third wavenumber, and/or modifying a quantity derived from the measured wave front based on the determined phase shift at the third wavenumber.

In some embodiments, the method may further include performing the first measurement of phase shift at the first wavenumber and the second measurement of phase shift at the second wavenumber. This may involve wave front measurements or wave front error measurements at the first and second wavenumbers.

In some embodiments, the method may further include obtaining design information relating to the dielectric coating. Then, the method may yet further include determining the nominal phase shift for the dielectric coating as a function of wavenumber based on the design information.

In some embodiments, the dielectric coating may include a plurality of stacked layers. The plurality of stacked layers may be composed of different materials. Further, the plurality of layers may be supported by a substrate, e.g., may be stacked on the substrate.

In some embodiments, the design information may include a total optical thickness of the dielectric coating.

In some embodiments, the phase shift may further be a function of an angle of incidence at the dielectric coating.

In some embodiments, the method may further include correcting the phase shift as a function of wavenumber based on a first spectral profile of a first light source that is used for the first measurement and/or a second spectral profile of a second light source that is used for the second measurement. Thereby, any deviation of the spectra of the first and second light sources from line spectra may be accounted for.

In some embodiments, the method may further include obtaining a result of a fourth measurement of a wave front after reflection by, or transmission through, the dielectric coating at a fourth wavenumber, the fourth wavenumber being different from the first and second wavenumbers. Then, the method may further include reconstructing the wave front after reflection by, or transmission through, the dielectric coating at the fourth wavenumber using the determined wavenumber shift and the nominal phase shift. The method may yet further include correcting the determined wavenumber shift based on a comparison of the measured and reconstructed wave fronts at the fourth wavenumber.

Thereby, the determined wavenumber shift may be further refined and accuracy of the overall calculation of the phase shift may be increased.

Another aspect of the disclosure relates to an apparatus for determining a phase shift caused by reflection at, or transmission through, a dielectric coating as a function of wavenumber, the apparatus comprising one or more processors adapted to perform the method of the above aspect and its embodiments.

Another aspect of the disclosure relates to a computer-executable program that, when executed by a processor, causes the processor to perform the method of the above aspect and its embodiments.

Another aspect of the disclosure relates to a computer-readable storage medium storing the computer-executable program according to the preceding aspect.

Yet another aspect of the disclosure relates to a method of determining a layer design for a dielectric coating. The dielectric coating may comprise a plurality of stacked layers. The method may include determining a plurality of layer designs that are in conformity with a desired optical property of the dielectric coating (e.g., a spectral reflectance R). The method may further include determining, for each of the layer designs, a metric Z that depends on the total optical thickness of the dielectric coating according to that layer design and a bandwidth of interest, in terms of wavenumbers, for which the dielectric coating is intended for use. The method may yet further include selecting, as a final layer design for the dielectric coating, that layer design among the plurality of layer designs that has the smallest value of the metric Z. The bandwidth of interest may be a pre-set parameter in accordance with a desired use of the dielectric coating.

By referring to the metric Z and measuring feasible layer designs against this metric, the proposed method aids the design of dielectric coatings with relaxed tolerance on thickness error.

In some embodiments, the metric Z may be given by or proportional to $$Z = x \cdot \frac{\Delta k}{\pi},$$

where x is the total optical thickness of the dielectric coating and $\Delta k$ is the bandwidth of interest.

It will be appreciated that method steps and apparatus or system features may be interchanged in many ways. In particular, the details of the disclosed method can be implemented by an apparatus or system, and vice versa, as the skilled person will appreciate. Moreover, any of the above statements made with respect to methods are understood to likewise apply to apparatus and systems, and vice versa.

BRIEF DESCRIPTION OF THE FIGURES

Exemplary embodiments of the disclosure are explained below with reference to the accompanying drawings, wherein.

DETAILED DESCRIPTION

Figure 1:
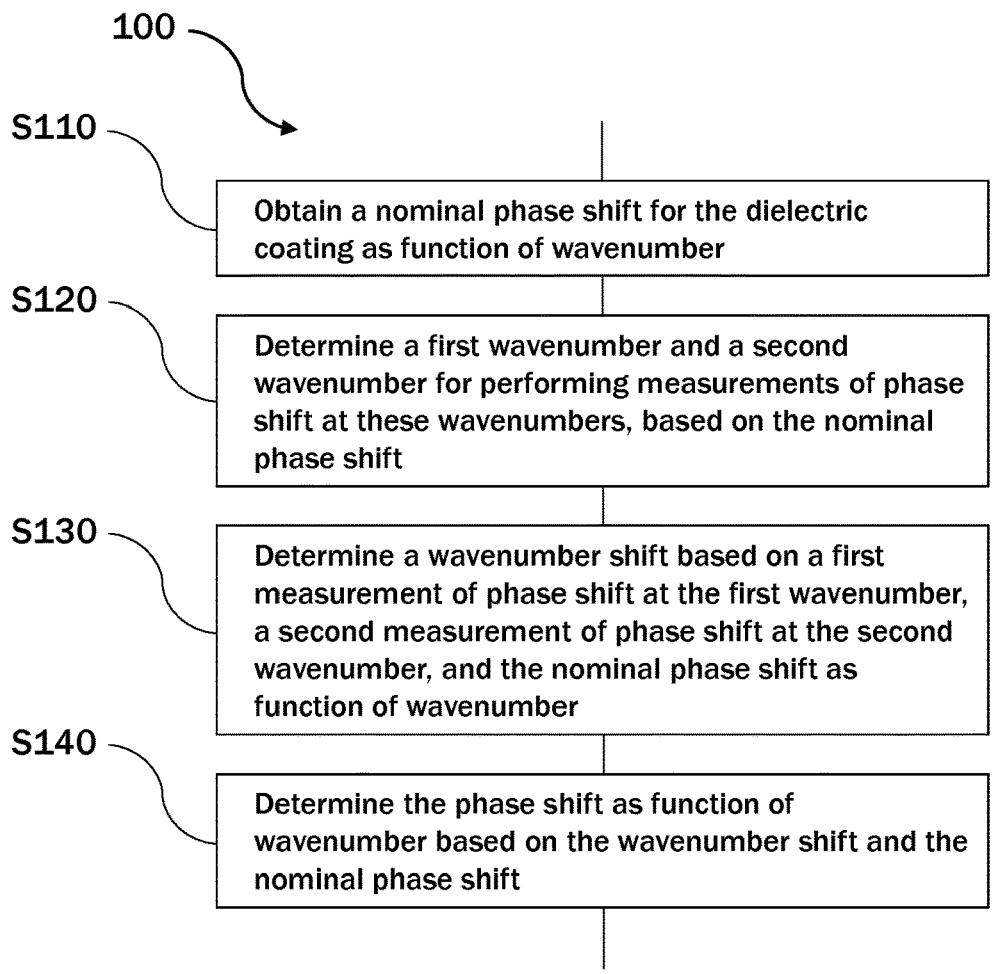
FIG. 1 is a flowchart schematically illustrating an example of a method of determining a phase shift caused by reflection at, or transmission through, a dielectric coating as a function of wavenumber according to embodiments of the disclosure.

In the following, example embodiments of the disclosure will be described with reference to the appended figures. Identical elements in the figures may be indicated by identical reference numbers, and repeated description thereof may be omitted.

In the following, the terms wavenumber k and wavelength $\lambda$ may be used interchangeably, since these quantities are directly related to each other via $k=2\pi/\lambda$. Thus, a function of wavenumber is implicitly also a function of wavelength, and vice versa.

The present disclosure addresses the problem in dielectric coatings that the phase shift of the as-manufactured dielectric coating departs from the as-designed phase shift. The phase shift is defined as the phase in reflection or in transmission added by a dielectric coating to an incoming wave front.

To address this problem, the present disclosure proposes a process enabling the design of dielectric coatings that are robust with respect to thickness errors from the phase shift point of view. The present disclosure further proposes a process for the reconstruction of the total phase of a wave front in reflection and transmission when reflected or transmitted by a dielectric coating for any arbitrary wavelength $\lambda$, with minimum prior knowledge on the details (e.g., layers definition) of the design of the dielectric coating. Notably, the proposed process only requires minimal knowledge on the as-designed dielectric coating and access to a wave front sensor with at least two wavelengths. Higher accuracy of the phase reconstruction of the reflected/transmitted wave front can be achieved if the wavelengths of the wave front sensor can be tuned.

Broadly speaking, the process for the reconstruction of the total phase of a wave front in reflection and transmission when reflected or transmitted by a dielectric coating for any arbitrary wavelength $\lambda$ is based on the following basic property of the phase shift of a dielectric coating when submitted to small changes in the thickness of its layers. Namely, as the inventor has demonstrated, the phase shift of the dielectric coating as-manufactured can be approximated by a constant wavenumber shift $\delta k$ applied to the phase shift of the dielectric coating as-designed. As a corollary, it has further been found that the robustness of a dielectric coating in terms of phase shift can be assessed by a simple unit-less metric $$Z = x \cdot \frac{\Delta k}{\pi}$$

with x being the total optical thickness seen by a ray going through the optical coating at normal incidence and $\Delta k$ being the bandwidth of interest in wavenumber.

Next, the theoretical framework for determining the phase shift of a dielectric coating will be described.

The phase shift $\phi$ with wavelength $\lambda$ of multi-layer coatings (e.g., dielectric coatings) is a well-known phenomenon [Baumeister, et al., 1959]. The phase shift introduced by a simple reflection on a mirror is equal to $\pi$ while the coating stack phase shift depends on its characteristic matrix [Born, et al., 1999] [Abeles, 1950], the elements of which depend on the materials used and on the geometry of the layers of the coating stacks. In the absence of spatial non-uniformities, the phase $\phi$ is constant over the area covered by the beam footprint resulting in a piston term in the departing wave front. Thus, the point spread function of an imaging optical system at $\lambda$ is not impacted by the coating phase shift. However, the coating non-uniformities introduced during manufacturing will have an impact on $\phi$ but a negligible one on the spectral reflectance [Strojnik, 1995]. Thus, the actual value of $\phi$ is dependent on $\lambda$, on the spatial coordinates on the coated surface and on the angle of incidence $\theta$.

Theoretical work [Tikhonravov, et al., 1997] has demonstrated that the phase shift of the reflected wave can be either an oscillating function of the wave number $k=2\pi/\lambda$ or a decreasing function of k with the average slope being negative and twice the total thickness of the coating. The nature of the phase shift variation depends uniquely on the exact definition of the coating stack.

The problem of retrieving the phase shift introduced by the as-manufactured coating is equivalent to determining the characteristic matrix M of the as-manufactured coating. Since the coating is assumed to be non-uniform, the matrix M is dependent on the coordinates $X=(x, y)$ on the coated surface. The aim is thus to determine a set of matrices, one per sampling point on the coated surface.

The elements of the matrix $M(X)$ are dependent on the actual refractive index $n_i$ and thickness $t_i$ of each layer of the coating stack. The pair $(n_i, t_i)$ can be determined experimentally using ellipsometry [Oreb, et al., 1999].

For the Laser Interferometer Gravitational-Wave Observatory (LIGO) project, a characterization of the coating phase shift [Oreb, et al., 1999] was performed by measuring the wave front error both in transmission and reflection, and using ellipsometry measurements of the coatings to derive the thickness variation.

The approach used in [Oreb, et al., 1999] requires the knowledge of the as-designed coating stack definition to retrieve the phase shift for each polarization. This information is usually not provided by coating manufacturers.

The characterization of $\phi$ is of primordial importance for the measurement of $\lambda$ in spectroscopy using Fabry-Perot interferometers. For this application, techniques were developed to retrieve $\phi$ from the measured spectral reflectance $R(\lambda)$ using the Kramers-Kronig relations [Lichten, 1985] based on the definition of the reflectance $r(\lambda)=\sqrt{R(\lambda)} \cdot e^{i\Phi}$. This approach has two major drawbacks as far as, e.g., ESA's Euclid project is concerned. Namely, the resulting $\phi$ is not unique [Tikhonravov, et al., 1997], and the measured $R(\lambda)$ is averaged over an area larger than the sampling needed to retrieve the medium and high spatial frequencies.

A probability assessment method also has been proposed [Furman, et al., 1992]. However, such method does not provide any knowledge on the spatial distribution of errors over the coated optical element.

The techniques discussed above are not compatible with, e.g., the Euclid project's needs and constraints. None provide easy access to the spatial distribution of phase error which will have an impact on the point spread function metrics. To obtain such knowledge, large modifications in the current test plan would be needed (e.g., ellipsometry with high spatial sampling) and possibly the development of new optical test setups or modification of existing ones.

In the following, a process for deriving the wave front error (as an example of phase shift) in reflection of a dielectric coating (e.g., coatings of a dichroic) is described. This process is based on the available information on the coatings. For the example of Euclid's dichroic, the available information includes: wave front error maps at two wavelengths in transmission and reflection of the dichroic assembly (with beam splitter coating and anti-reflection coating) at room temperature, at normal incidence with a 32×32 pixels resolution, the as-designed phase shift $\phi_c(\lambda)$ at normal incidence, the as-designed spectral reflectance $R(\lambda)$ for different angles of incidence for the s and p polarizations, the as-designed total thickness of the coating stack, and the as-designed total thickness of each material in the coating stack. However, not all of the above information may be available in general.

An exact solution to calculate the derivatives $\delta r(\lambda)/\delta d_j$ and $\delta t(\lambda)/\delta d_j$ of the coating stack reflectance $r(\lambda)$ and transmittance $t(\lambda)$ versus the j-th layer's thickness $d_j$ has been derived in [Furman, et al., 1992] and in [Mouchart, 1977]. However, the calculation requires to have a priori knowledge of the as-designed coating stack definition. An exact solution thus cannot be derived in the general case in which this information may not be available. The solution proposed by this disclosure will instead rely on measurements of the optical properties (e.g., wave front error) of the coating stack.

First, a description of the phases of interest will be given. The total phase $\phi_r(k, \theta)$ in reflection/transmission is the combination of the phase shift $\phi'_c(k, \theta)$ of the coating considered as a stack of perfectly parallel layers and the phase $\phi_s(k, \theta)$ induced by local deformation of the coating layers due to substrate deformation. Thus, $$\phi_r(k,\theta)=\phi_c'(k,\theta)+\phi_s(k,\theta) \quad (1)$$

with $\theta$ the angle of incidence on the first (e.g., uppermost) layer of the stack. If a given angle of incidence is considered, such as normal incidence, the argument ° may be omitted. For the purpose of this analysis, $\phi_s(k, \theta)$ may be written as $\phi_s(k, \theta)=k \cdot l \cdot \cos(\theta)$, with l the total optical path difference introduced by local surface defects. This term is independent of the wavelength $\lambda$. In some embodiments, the term $\phi_s(k, \theta)$ may be neglected in Eq. (1).

Eq. (1) ignores the effect of the local slopes due to the coating substrate [Strojnik, 1995]. Typically, the impact is negligible.

As can be seen from Eq. (1), the total phase in reflection/transmission comprises (provided that the term $\phi_s(k, \theta)$ is not neglected), a first contribution $\phi'_c$ that depends on thickness variations of stacked layers of the dielectric coating from their respective nominal thickness and a second contribution $\phi_s$ that depends on local deformation of the dielectric coating due to substrate deformation.

Figure 7:
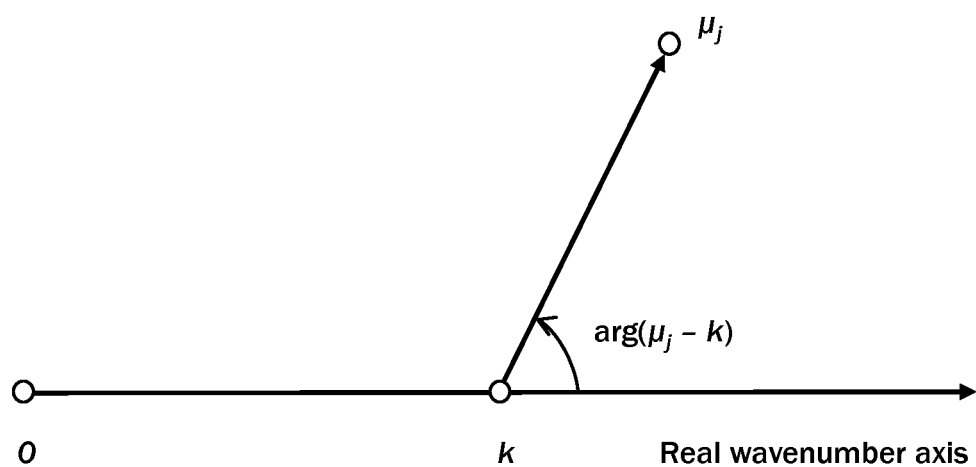

Next, phase variations with the thickness of the coating's layers will be described, following the approach described in [Tikhonravov, et al., 1997] and considering the spectral coefficients of the multilayer coating in the complex wavenumber plane v written as $v=k+i\sigma$ with $k=2\pi/\lambda$. The spectral coefficients $f_1$ and $f_2$ are defined as $$f_1(v)=1/t(v) \quad$$

$$f_2(v)=r(v)/t(v) \quad (2)$$

with t(v) being the complex normalized amplitude transmittance and r(v) being the complex normalized amplitude reflectance of the multilayer stack. It follows from Eq. (2) that the phase shift introduced by the coating stack in transmittance (respectively, in reflectance) is the argument of t(k) (respectively, r(k)) as defined in $$\arg[t(k)] = -\sum_{j}^{\infty} \arg(\mu_j - k) + \sum_{j}^{\infty} \arg(\mu_j) \quad (3)$$

$$\phi_c(k) = \arg[r(k)] = \arg[f_2(k)] + \arg[t(k)]$$

$$\arg[f_2(k)] = \sum_{j}^{\infty} \arg(v_j - k) - \sum_{j}^{\infty} \arg(v_j)$$

with $\mu_j$ being the zeros of $f_1$ and $v_j$ being the zeros of $f_2$. The geometrical meaning of Eq. (3) is explained in FIG. 7.

Figure 8:
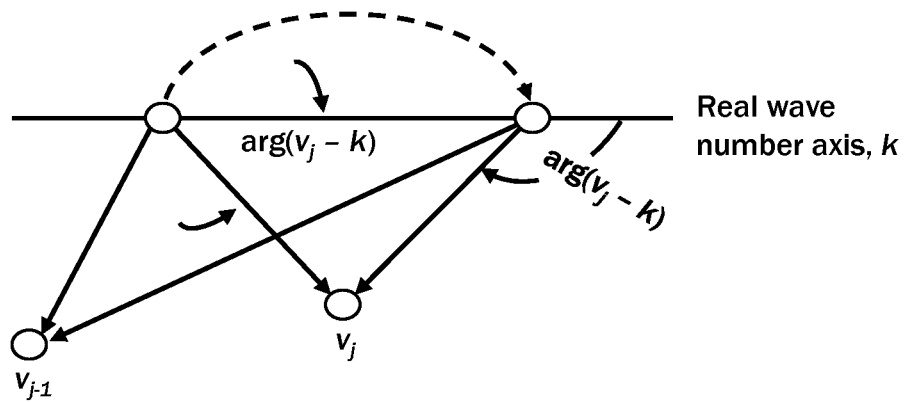

The behavior of the phase shift with wavenumber k is dependent on the position of the zeros $v_j$ with respect to the k-axis. In case all the zeros are located in the upper half-plane, the phase shift is an oscillating function of k that does not change significantly in any wavenumber area. On the other hand, if the zeros are all located on the lower half-plane, the phase shift is a decreasing function of k with an average slope of $$\frac{d\phi(k)}{d\lambda} = -2x,$$

with x the total optical thickness of the coating stack. The situation of all zeros $v_j$ being located in the lower half-plane is illustrated in FIG. 8. In general, manufactured coatings have zeros located on either half-plane of the wavenumber complex plane.

The zeros of the functions $f_1$ and $f_2$ have the following properties: The average spacing between zeros is $\pi/x$ with x being the total optical path of the coating stack at normal incidence. Further, the range of values for $\sigma$ is limited to a narrow band around the real wavenumber axis.

Figure 9:
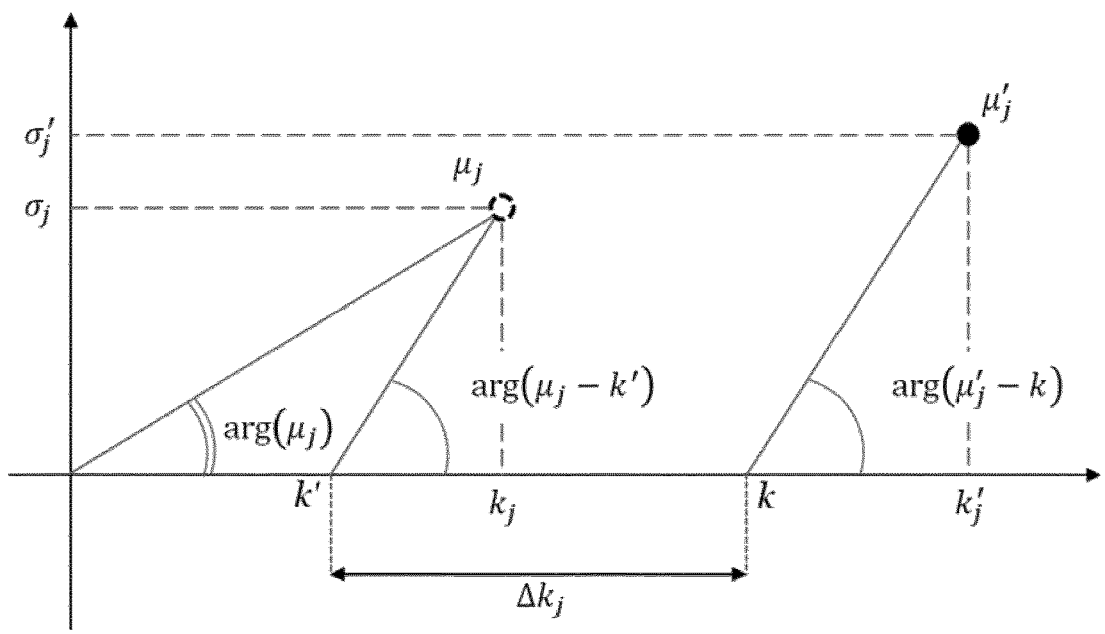

Next, the phase in transmission will be analyzed looking at the properties of the function $f_1$ at normal incidence. An error on the thickness of each individual layer will lead to a different structure in the coating stack and thus to a different definition of the zeros of the function $f_1$. This is associated with a change in the total layer optical thickness denoted by x'. It will be assumed that the thickness variations are small enough to keep the sign of the of the coordinate $\sigma_j$ of the zeros $\mu_j$ unchanged. In that case, for a given k, there is a wavenumber k'(j) such that $\arg(\mu_j-k'(j))=\arg(\mu'_j-k)$ with $\mu'_j$ being the zeros of the modified spectral coefficient. This is illustrated in FIG. 9. The same holds for $f_2$.

It will now be shown that, under certain conditions, the shift $\sigma k_j=k'(j)-k$ is equal to $\delta k=$cste for all zeros and for both spectral coefficients. To this end, reference will be made to each term in Eq. (3) defining the phase shift in transmission for the as-manufactured coating stack.

The imaginary part $\sigma_j$ of the complex wavenumber is limited to a narrow strip around the real wavenumber axis, thus the changes in $\sigma_j$ can be neglected. Hence, $$\tan(\arg(\mu'_j)) \approx \frac{1}{(1 + \delta k_j/k_j)} \times \tan(\arg(\mu_j)).$$

Thus, under the condition $\delta k_j/k_j \ll 1$, one obtains $\arg(\mu'_j) \approx \arg(\mu_j)$.

Since $\sigma'_j \approx \sigma_j$, it can be concluded that $\delta k_j = k'(j) - k \approx k_j - k'_j$. It is known that the zeros of the spectral coefficient $f_1$ are separated by $\pi/x$ in average along the k-axis, and the same applies for the modified spectral coefficient $f_1'$ but with $\pi/x'$. Thus, one can write $k_{j+1} - k_j = \pi/x + \delta_j$ with $\delta_j$ a second order term and $x = 2\Sigma_1^N n_j t_j$, with $n_j$ the refractive index and $t_j$ the thickness of the j-th layer of the coating stack. For the as-manufactured coating similar considerations hold. Thus, at first order:

$$\delta k_{j+1} - \delta k_j \approx \frac{\pi}{x} - \frac{\pi}{x'} \qquad (4)$$

Since the total optical paths x' and x are commensurate one can write $$\frac{\pi}{x'} = \frac{\pi}{x} \cdot (1 + \epsilon).$$

With the condition that $|\epsilon| \ll 1$, it is straightforward to derive from Eq. (4) that $\forall j$, $\delta k_j \approx \delta k_{j+1} = \delta k$. The above findings lead to the following conclusion:

$$\arg[t'(k)] = \arg[t(k+\delta k)] \qquad (5)$$

Since the spectral dependence of $f_2(k)$ is analogous to that of $f_1(k)$, it follows that $\arg[f_2'(k)] = \arg[f_2(k+\delta k)]$. Consequently, the phase in reflection $\arg[r'(k)] = \phi'_c(k, 0)$ of the as-manufactured coating stack can be derived from the as-designed phase $\arg[r(k)] = \phi_c(k, 0)$ as follows:

$$\phi'_c(k,0) = \phi_c(k+\delta k, 0) \qquad (6)$$

Eq. (6) describes an important relationship in the context of the present disclosure.

FIG. 1 is a flowchart schematically illustrating an example of a method 100 of determining a phase shift caused by reflection at a dielectric coating ($\phi_r(k)$) or transmission through the dielectric coating ($\phi_t(k)$) as a function of wavenumber according to embodiments of the disclosure. This method is at least partly based on the fact that Eq. (6) does hold.

The dielectric coating comprises a plurality of stacked layers. By design, each layer has constant thickness. The plurality of stacked layers may be composed of different materials. In general, the plurality of stacked layers may have different indexes of refraction. The plurality of stacked layers may be provided on a substrate. The dielectric coating may be used in reflection mode and in transmission mode. In either case, a wave front incident on the dielectric coating will undergo a phase shift. This phase shift may be known for the as-designed (i.e., nominal) dielectric coating. However, the as-manufactured dielectric coating may be different from the as-designed dielectric coating due to manufacturing errors. Method 100 seeks to determine the actual phase shift of the as-manufactured dielectric coating, as a function of wavenumber. The actual phase shift may have a portion resulting from thickness variations of the layers of the dielectric coating (assuming layers of constant thickness) and a portion resulting from local deformations of the dielectric coating due to substrate deformation.

Notably, the steps of method 100 may be performed for each of a plurality of points on the (surface of the) dielectric coating. Thereby, a map of the actual phase shift depending on position (x,y) on the dielectric coating can be obtained.

Moreover, the steps of method 100 may be performed for each of a plurality of angles of incidence. Alternatively, the actual phase shift for a given angle of incidence may be analytically derived from the actual phase shift at another angle of incidence, e.g., normal incidence.

At step S110, a nominal phase shift $\phi_c(k)$ for the dielectric coating as a function of wavenumber is obtained. The nominal phase shift is the (known) phase shift that would be applied to a wave front in reflection or transmission by the as-designed dielectric coating. The nominal phase shift may be given for normal incidence of light (e.g., of the wave front) on the dielectric coating. Alternatively, the nominal phase shift may be given for a plurality of distinct angles of incidence. In any case, either information is sufficient for determining the nominal phase shift at an arbitrary angle of incidence, e.g., via analytic relationships or interpolation.

The nominal phase shift $\phi_c(k)$ may be provided by the manufacturer of the dielectric coating, for example. Alternatively, the nominal phase shift may be determined from design information relating to the dielectric coating. In this case, step S110 would include the sub-steps of obtaining the design information of the dielectric coating (e.g., a configuration of the as-designed dielectric coating), and determining the nominal phase shift (as a function of wavenumber) based on the design information. The design information may include a total optical thickness of the dielectric coating (as designed), for example.

At step S120, a first wavenumber $k_1$ and a second wavenumber $k_2$ for performing measurements of phase shift (e.g., wave front measurements or wave front error measurements) at these wavenumbers are determined based on the nominal phase shift.

Considering, in general, the measurement of the wave front of the coating stack in reflection at normal incidence at two different wavenumbers $k_1$ and $k_2$, with $k_1 < k_2$, the measured optical path difference $OPD_i$ is such that with the piston term removed $$k_i \cdot OPD_i = \phi_c(k_i + \delta_k, 0) + k_i \cdot l \qquad (7)$$

with $OPD_i$ being the optical path difference dependent on the coordinates within the pupil measurement, l being a constant optical path depending on the coating substrate surface irregularities, and $i \in \{1,2\}$. Notably, in some implementations of the present disclosure, coating substrate surface irregularities may be neglected (which would correspond to setting l=0 in Eq. (7)).

The term $\phi_c(k_i + \delta k)$ can be Taylor-expanded around $k_i$:

$$\phi_c(k_i + \delta k, 0) = \phi_c(k_i, 0) + \delta k \cdot \frac{d\phi_c}{dk}(k_i, 0) + R(k_i) \text{ with} \qquad (8)$$

$$R(k_i) = \sum_{n=2}^{N} \frac{\delta k^n}{n!} \cdot \frac{d^n \phi_c}{dk^n}(k_i, 0).$$

In some embodiments, N may be set to infinity, $N = \infty$. In other embodiments, a finite number of higher orders of the Taylor expansion of $\phi_c(k+\delta k)$ may be retained. The set of equations in Eq. (7) have a unique solution for k and l if and only if the wavenumbers $k_1$ and $k_2$ are chosen such that they satisfy (or substantially or approximately satisfy)

$$\chi = \frac{R(k_2)}{k_2} - \frac{R(k_1)}{k_1} = 0 \qquad (9)$$

Thus, the first wavenumber $k_1$ and the second wavenumber $k_2$ may be determined such that they satisfy (or substantially or approximately satisfy) the relation $$\chi = \frac{R(k_2)}{k_2} - \frac{R(k_1)}{k_1} = 0,$$

where R(k) includes higher order terms (second order or higher) of the Taylor expansion of the nominal phase shift at wavenumber k. If a given set of fixed wavenumbers for performing measurements (e.g., wave front measurements or wave front error measurements) are available, those two wavenumbers may by chosen as the first and second wavenumbers that minimize $\chi$. Accordingly, step S120 may also involve selecting, from a plurality of wavenumbers at which wave front measurements can be performed, that pair of wavenumbers that minimizes $\chi$.

At step S130, a wavenumber shift k is determined (e.g., calculated) based on a first measurement of phase shift at the first wavenumber (e.g., $OPD_1$), a second measurement of phase shift at the second wavenumber (e.g., $OPD_2$), and the nominal phase shift $\phi_c$ as a function of wavenumber. This wavenumber shift δk emulates the phase shift resulting from thickness variations of the dielectric coating. That is, the as-manufactured phase shift at a given wavenumber k can be obtained by shifting the given wavenumber by the wavenumber shift δk and evaluating the nominal phase shift function $\phi_c$ at the shifted wavenumber k+δk.

For instance, with Eq. (9) satisfied, using Eq. (8) the set of equations in Eq. (7) can be solved for k as $$\delta k = \frac{k_2 \cdot k_1 \cdot (OPD_2 - OPD_1) - \{k_1 \cdot \phi_c(k_2, 0) - k_2 \cdot \phi_c(k_1, 0)\}}{k_1 \cdot \frac{d\phi_c}{dk}(k_2, 0) - k_2 \cdot \frac{d\phi_c}{dk}(k_1, 0)} \quad (10)$$

That is, the wavenumber shift k can be determined using Eq. (10), for example.

In some embodiments, step S130 may further involve determining (e.g., calculating) a total optical path difference l that is caused by local deformation of the dielectric coating (e.g., due to substrate irregularities) based on the first measurement of phase shift at the first wavenumber (e.g., $OPD_1$), the second measurement of phase shift at the second wavenumber (e.g., $OPD_2$), and the nominal phase shift $\phi_c$. The total optical path difference l may be further determined based on the first wavenumber $k_1$ and the second wavenumber $k_2$.

For instance, the total optical path difference l can be derived from Eq. (10) and Eq. (7). In its simplest form, the total optical path difference l can be expressed as:

$$l = \frac{1}{2} \cdot \left\{ OPD_1 + OPD_2 - \left[ \frac{\phi_c(k_1 + \delta k, 0)}{k_1} + \frac{\phi_c(k_2 + \delta k, 0)}{k_2} \right] \right\} \quad (11)$$

In some embodiments, step S130 may include performing the first measurement of phase shift at the first wave number $k_1$ and performing the second measurement of phase shift at the second wave number $k_2$.

At step S140, the phase shift as a function of wavenumber is determined based on the wavenumber shift k and the nominal phase shift $\phi_c$. This phase shift is the actual phase shift that is applied to a wave front by the as-manufactured dielectric coating. The phase shift may relate to a wave front error, i.e., to a deviation of the actual wave front (the wave front resulting from reflection at, or transmission through, the as-manufactured dielectric coating) from the wave front that would be obtained for the as-designed (nominal) dielectric coating.

In some embodiments, the phase shift as a function of wavenumber is determined further based on the total optical path difference l. For example, the second contribution of the phase shift may be determined based on the total optical path difference l.

Typically, the phase shift is further a function of angle of incidence at the dielectric coating, i.e., depends on the angle of incidence. To first approximation, the functional dependence on the angle of incidence may be approximated by a cosine function.

A more detailed derivation of phase variation with the angle of incidence θ will be provided below.

From [Baumeister, 2004], it is known that the phase shift $\phi_0$ in reflection referenced at the top layer of the coating and the phase shift $\phi_e$ in reflection referenced at the last layer (laying on the substrate) are related by $$\psi(k,\theta) = \phi_e(k,\theta) - \phi_0(k,\theta) = 2kt \cos\theta = \omega(k,0) \cdot \cos\theta \quad (12)$$

with t being the mechanical thickness of the coating stack. From Eq. (12), it is straightforward to show that for the as-manufactured coating stack one has $$\psi'(k,\theta) \approx \omega(k+\delta k, \theta) \quad (13)$$

Then from Eq. (13), $\phi'_c(k, \theta) \approx \phi_c(k+\delta k, \theta)$. It is thus sufficient to know the phase shift as-designed, $\phi_c(k, \theta)$.

The determination of the phase shift as-designed, $\phi_c(k, \theta)$, requires to know the characteristic matrix of the coating accounting for the multi-reflections within each layer. The matrix in [Born, et al., 1999] cannot be used as it is valid only for a single reflection for each layer. However, by calculating $\phi_c(k, \theta_0)$ for an angle of incidence $\theta_0$ it is possible to derive the phase shift at any wavenumber by applying a wavenumber shift $\delta k_\theta$ to the phase shift at normal incidence such that $\phi_c(k, \theta) = \phi_c(k+\delta k_\theta, 0)$. Notably, this wavenumber shift $\delta k_\theta$ is independent of the wavenumber shift δk: While the former implements (takes into account, or emulates) a difference in angle of incidence from an angle of incidence $\theta_0$, the latter implements (takes into account, or emulates) deviations of the as-manufactured coating from the as-designed coating. Thus, the wavenumber shift $\delta k_\theta$ may be referred to as angular wavenumber shift, or the like. Finally, one obtains:

$$\delta k_\theta = \delta k_{\theta_0} \times \left( \frac{1 - \cos\theta}{1 - \cos\theta_0} \right) \quad (14)$$

with $\delta k_{\theta_0}$ being the wavenumber shift calculated for the angle of incidence $\theta_0$.

Eq. (14) is justified by the fact that the zeros spacing π/x of the coating stack will vary as cos(θ) since the total optical path will vary approximately as 1/cos(θ).

Figure 10:
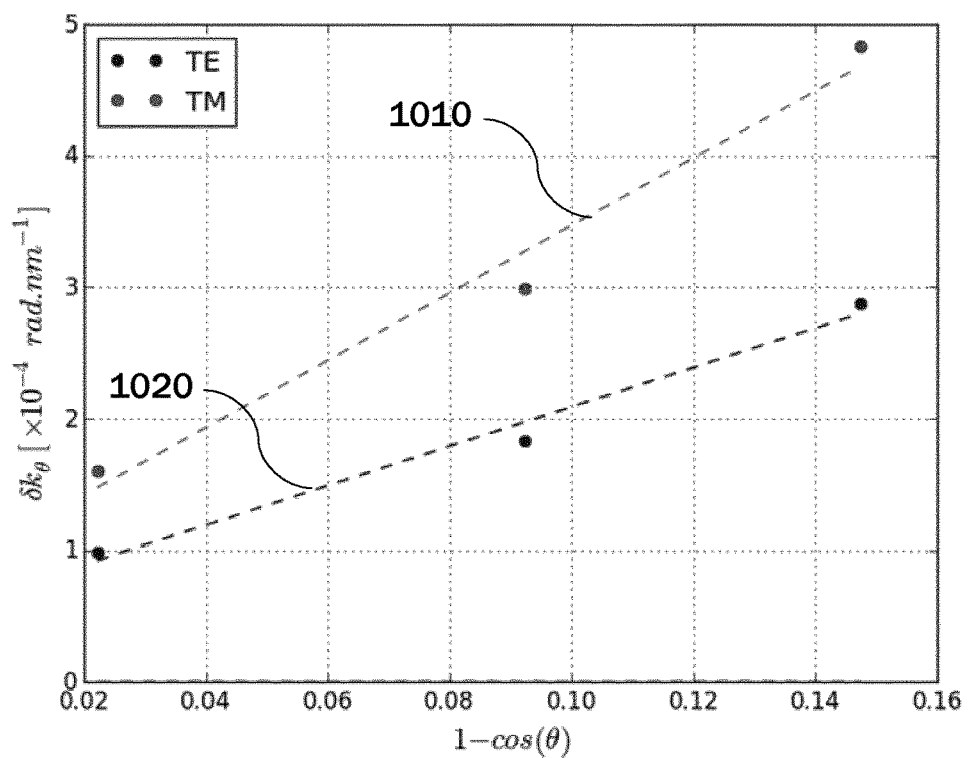
FIG. 10 is a graph illustrating an example of an angular wavenumber shift as a function of angle of incidence.

To verify Eq. (14), an analysis of the phase shift for the coating of Euclid's folding mirror 3 (FOM3) has been performed based on the data available. The phase shift is calculated for this mirror for three different incidences for both polarizations TE and TM considering only the spectral range [550 nm; 900 nm]. The wavenumber shift is derived by cross-correlation once the piston between the phase shift curves has been removed. The resulting (angular) wavenumber shift $\delta k_\theta$ for TE and TM polarizations as a function of angle of incidence $\theta$ is illustrated in FIG. 10, in which curve 1010 relates to TM polarization and curve 1020 relates to TE polarization.

Figure 11:
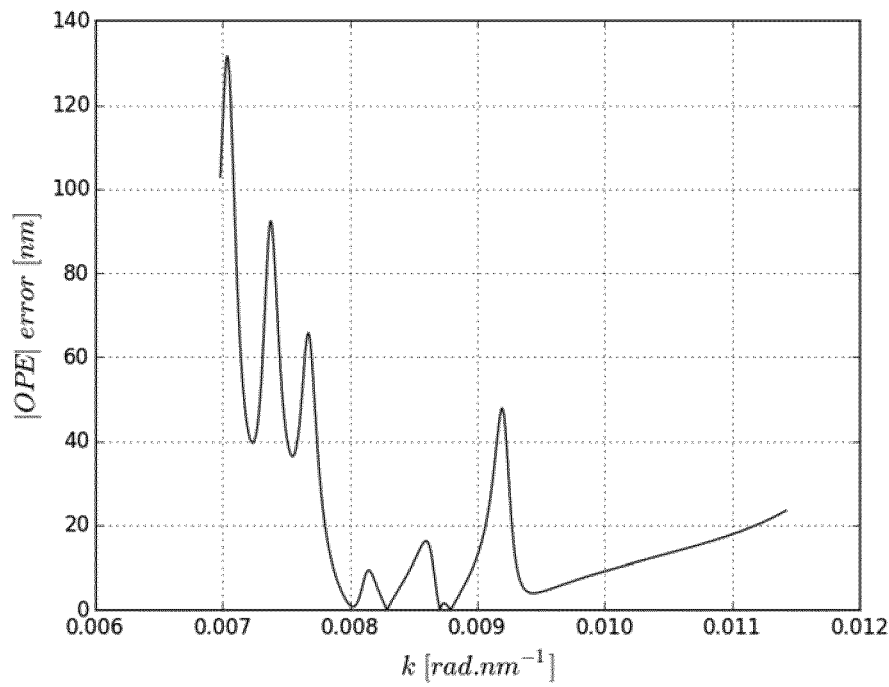
FIG. 11 and FIG. 12 are graphs illustrating examples of an optical path error for TE polarization at a fixed angle of incidence as a function of wavenumber, FIG. 13 schematically illustrates an outline of an example process according to embodiments of the disclosure.
Figure 12:
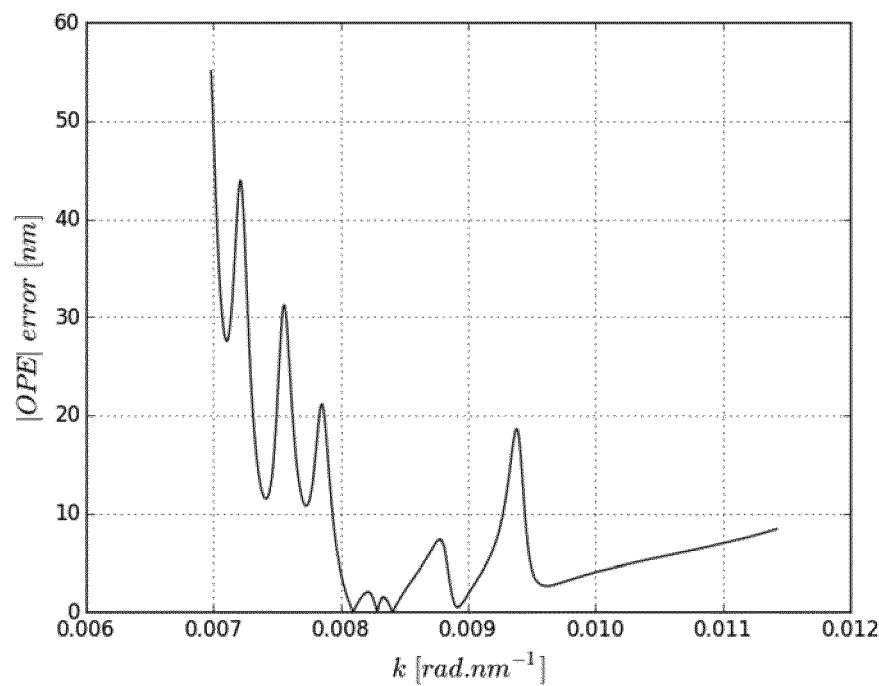

As expected, the wavenumber shift $\delta k_\theta$ increases as $\cos(\theta)$ increases and the variation is approximately linear. The correlation is lower for large angles of incidence and so is the resulting optical path error (OPE), as shown in FIG. 11 (OPE for TE polarization, $\theta_0=0°$, and $\theta=31.5°$). The OPE can be significantly reduced if the phase at $\theta=24.8°$ is chosen as reference instead of $\theta_0=0°$. This is shown in FIG. 12 (OPE for TE polarization, $\theta_0=24.8°$, and $\theta=31.5°$).

Figure 2:
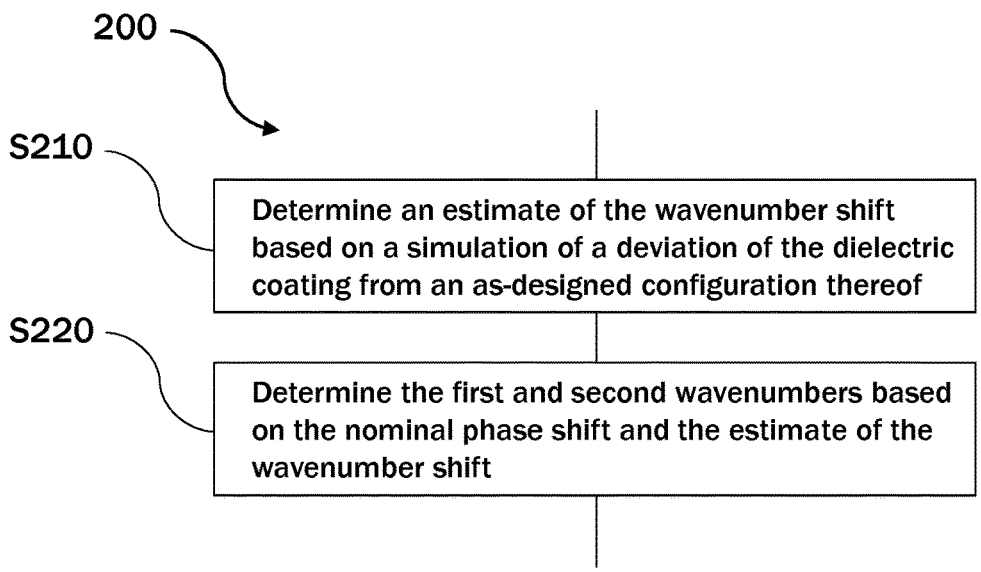
FIG. 2 is a flowchart schematically illustrating an example of an implementation of a step in the flowchart of FIG. 1 according to embodiments of the disclosure.

FIG. 2 is a flowchart schematically illustrating an example of a method 200, which is an implementation of step S120 in the method 100 of FIG. 1.

At step S210, an estimate of the wavenumber shift is determined based on a simulation of a deviation of the dielectric coating from an as-designed configuration thereof. The simulation may involve (analytically) perturbing the as-designed configuration of the dielectric coating.

At step S220, the first wavenumber and the second wavenumber are determined based on the nominal phase shift and the estimate of the wavenumber shift. That is, the first and second wavenumbers are determined further based on the estimate of the wavenumber shift.

For example, the first wavenumber $k_1$ and the second wavenumber $k_2$ may be determined such that they satisfy (or substantially or approximately satisfy) the relation $$\chi = \frac{R(k_2)}{k_2} - \frac{R(k_1)}{k_1} = 0,$$

where $R(k)$ includes higher order terms (second order or higher) of the Taylor expansion of the nominal phase shift at wavenumber k, as defined in Eq. (8). At this point, the estimate of the wavenumber shift $\delta k_{(e)}$ may be used to evaluate $R(k)$, e.g., via $$R(k) = \sum_{n=2}^{N} \frac{(\delta k_{(e)})^n}{n!} \cdot \frac{d^n \phi_c}{dk^n}(k, 0),$$

as described above. If a given set of fixed wavenumbers for performing measurements (e.g., wave front measurements or wave front error measurements) are available, those two wavenumbers may be chosen as the first and second wavenumbers that minimize $\chi$. Accordingly, step S220 may also involve selecting, from a plurality of wavenumbers at which wave front measurements can be performed, that pair of wavenumbers that minimizes $\chi$.

Figure 3:
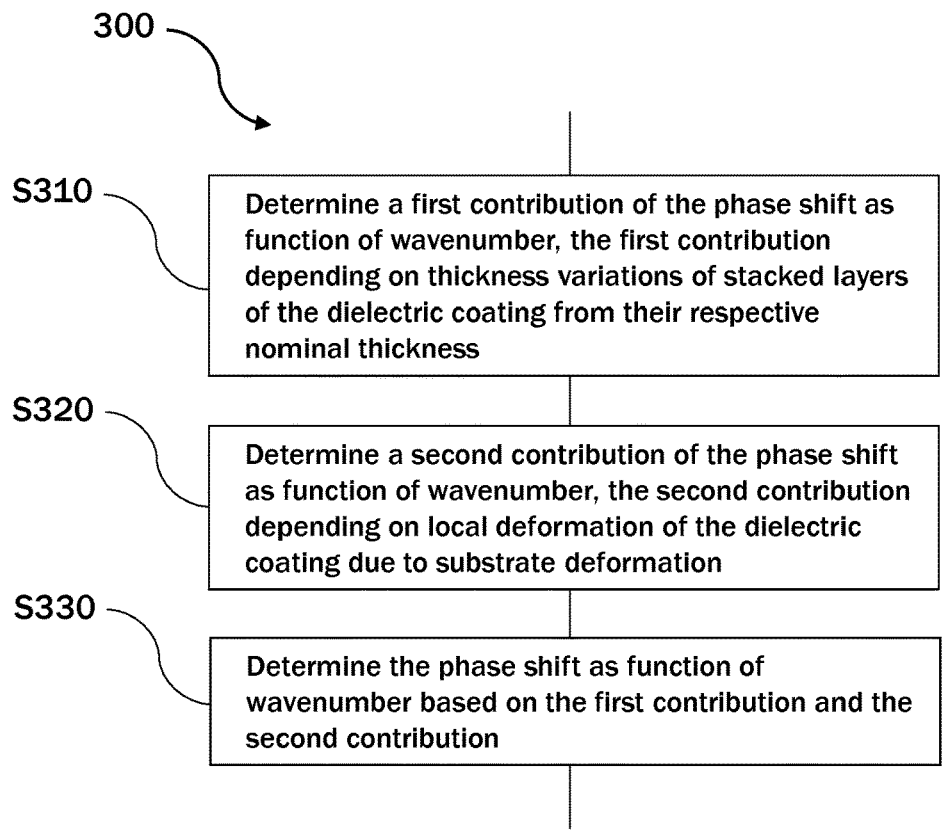
FIG. 3 is a flowchart schematically illustrating an example of an implementation of another step in the flowchart of FIG. 1 according to embodiments of the disclosure.

FIG. 3 is a flowchart schematically illustrating an example of a method 300, which is an implementation of step S140 in the method 100 of FIG. 1.

At step S310, a first contribution to the phase shift as a function of wavenumber is determined. The first contribution depends on thickness variations of stacked layers of the dielectric coating from their respective nominal thickness. That is, the first contribution is that contribution to the total phase shift that depends on thickness variations (variations of constant-thickness layers from their nominal thickness) of the stacked layers of the dielectric coating.

The first contribution can be determined by shifting the nominal phase shift as a function of wavenumber by the wavenumber shift. Accordingly, the first contribution, at a given wavenumber, would be given by the nominal phase shift evaluated at a shifted wavenumber, wherein the shifted wavenumber is obtained by shifting the given wavenumber by the wavenumber shift. In other words, the wavenumber shift indicates by how much the actual wavenumber would have to be shifted so that evaluating the nominal phase shift function at the shifted wavenumber yields the actual phase shift for the as-manufactured dielectric coating. If $\phi_c(k)$ indicates the nominal phase shift and $\phi'_c(k)$ indicates the first contribution, the first contribution would be given by $\phi'_c(k) = \phi_c(k+\delta k)$, with $\delta k$ being the wavenumber shift.

At step S320, a second contribution to the phase shift as a function of wavenumber is determined. The second contribution depends on local deformation of the dielectric coating due to substrate deformation. That is, the second contribution is that contribution to the total phase shift that depends on local deformation of the dielectric coating due to substrate deformation.

In some embodiments, determining the second contribution $\phi_s(k)$ may involve obtaining a product of the total optical path difference $l$ and the wavenumber k. In particular, the second contribution $\phi_s(k, \theta)$ may be given by $\phi_s(k) = k \cdot l \cdot \cos\theta$, as noted above.

At step S330, the phase shift as a function of wavenumber is determined based on the first contribution and the second contribution. For example, the phase shift may be obtained by summing the first and second contributions, e.g., via $\phi_r(k, \theta) = \phi'_c(k, \theta) + \phi_s(k, \theta) = \phi_c(k+\delta k, \theta) + k \cdot l \cdot \cos\theta$. In general, the phase shift may depend on a sum of the first and second contributions.

Figure 13:
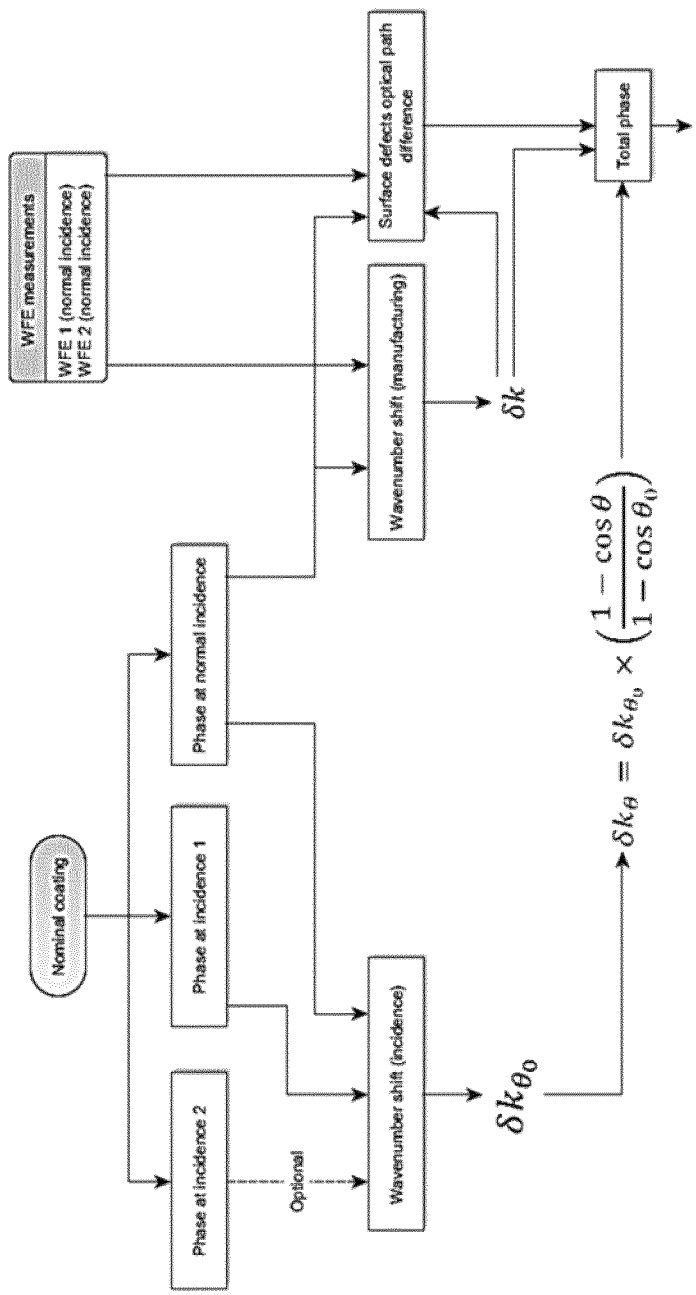

Using the method set out in FIG. 1 with optional details as set out in FIG. 2 and/or FIG. 3, the phase shift $\phi_r$ can be calculated for any angle of incidence $\theta$ for both polarizations. A schematic summary of the determination of the phase shift is illustrated in FIG. 13.

Figure 4:
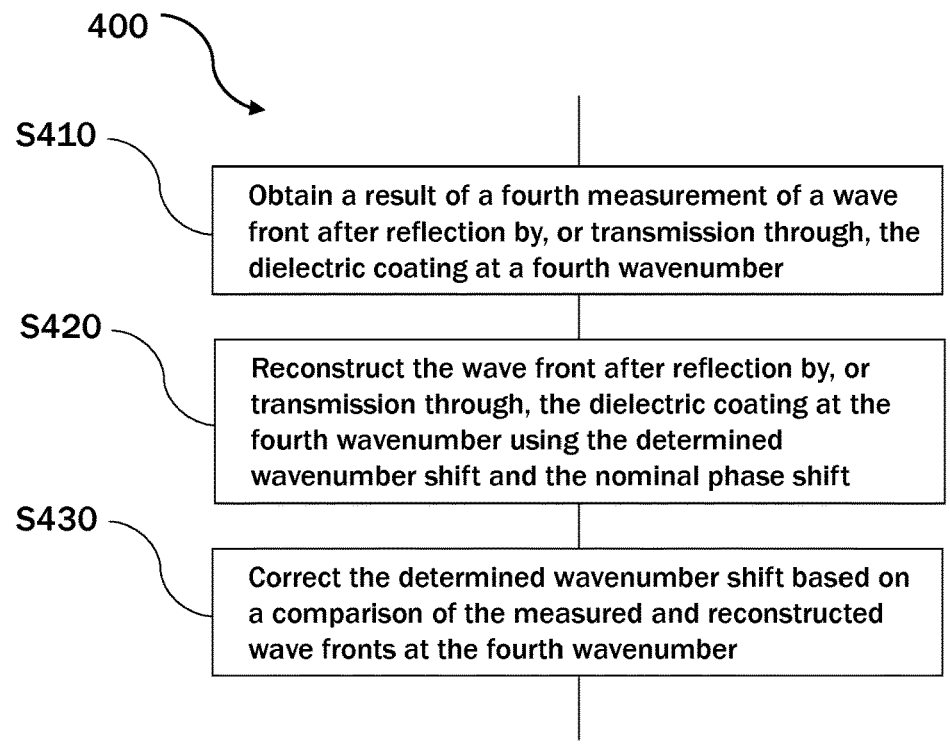
FIG. 4 is a flowchart schematically illustrating an example of steps according to embodiments of the disclosure that may be performed in conjunction with the steps in the flowchart of FIG. 1.

FIG. 4 is a flowchart schematically illustrating an example of a method 400 implementing steps according to embodiments of the disclosure that may be performed in conjunction with (e.g., subsequent to) the steps in the flowchart of FIG. 1.

At step S410, a result of a fourth measurement of a wave front after reflection by, or transmission through, the dielectric coating at a fourth wavenumber $k_4$ is obtained. The fourth wavenumber $k_4$ is different from the first and second wavenumbers $k_1$, $k_2$.

At step S420, a wave front after reflection by, or transmission through, the dielectric coating at the fourth wavenumber is reconstructed using the determined wavenumber shift $\delta k$ and the nominal phase shift $\phi_c(k)$. This may involve determining (e.g., calculating) the phase shift $\phi_r(k_4)$ at the fourth wavenumber and determining an outgoing wave front using the (known) incoming wave front and the phase shift $\phi_r(k_4)$ at the fourth wavenumber, e.g., by adding the phase shift to the incoming wave front for each location on the coating.

At step S430, the determined wavenumber shift $\delta k$ is corrected based on a comparison of the measured and reconstructed wave fronts at the fourth wavenumber $k_4$. The corrected wavenumber shift may then be used instead of the wavenumber shift determined at step S130 of method 100, e.g., in step S140 of method 100 and/or in the steps of method 500 described below.

Figure 5:
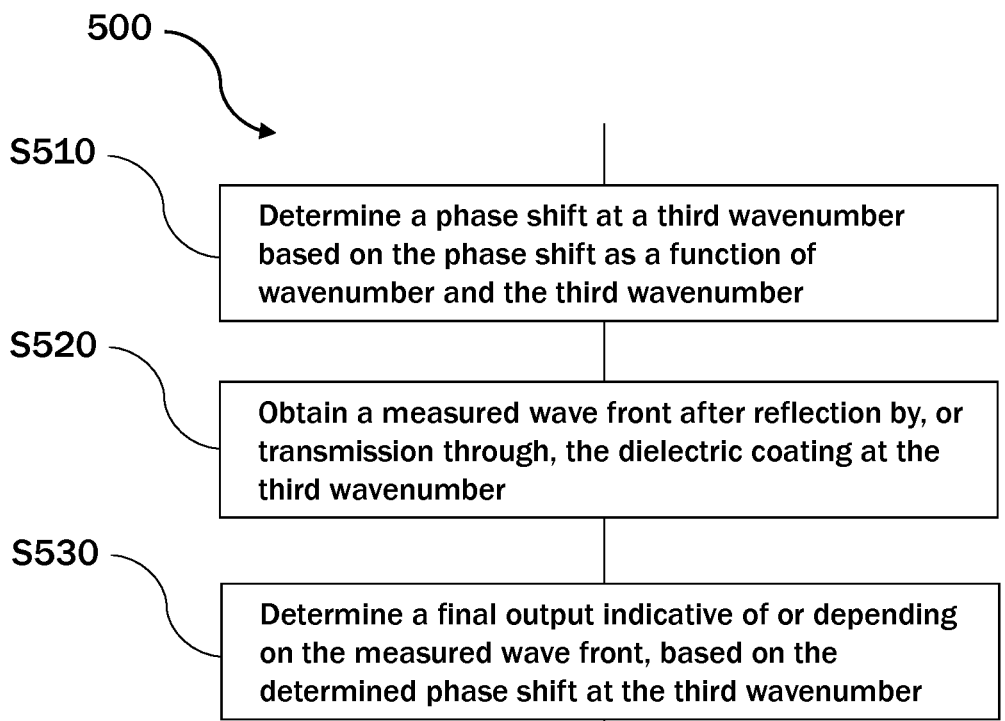
FIG. 5 is a flowchart schematically illustrating an example of further steps according to embodiments of the disclosure that may be performed subsequent to the steps in the flowchart of FIG. 1.

FIG. 5 is a flowchart schematically illustrating an example of a method 500 implementing further steps according to embodiments of the disclosure that may be performed in conjunction with (e.g., subsequent to) the steps in the flowchart of FIG. 1.

At step S510, a phase shift at a third wavenumber $k_3$ that is different from both the first and second wavenumbers $k_1$, $k_2$ is determined, based on the phase shift $\phi_r(k)$ as a function of wavenumber and the third wavenumber $k_3$, e.g., by evaluating the phase shift $\phi_r(k)$ as a function of wavenumber at the third wavenumber $k_3$.

At step S520, a measured wave front after reflection by, or transmission through, the dielectric coating at the third wavenumber $k_3$ is obtained.

At step S530, a final output indicative of or depending on the measured wave front is determined, based on the determined phase shift $\phi_r(k_3)$ at the third wavenumber $k_3$. This may involve calibrating the measurement of the wave front at the third wavenumber $k_3$ based on the determined phase shift $\phi_r(k_3)$ at the third wavenumber $k_3$, correcting the measured wave front at the third wavenumber $k_3$ based on the determined phase shift $\phi_r(k_3)$ at the third wavenumber $k_3$, and/or modifying (e.g., correcting) a quantity derived from the measured wave front based on the determined phase shift $\phi_r(k_3)$ at the third wavenumber $k_3$.

Figure 6:
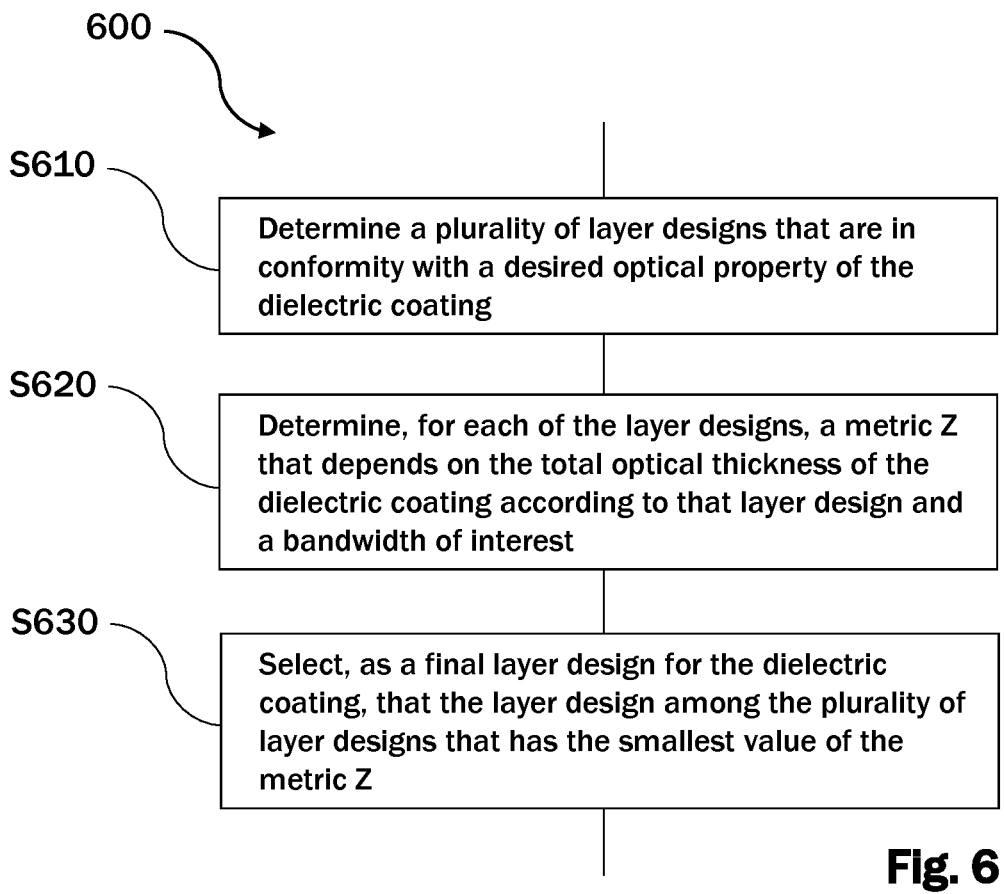
FIG. 6 is a flowchart schematically illustrating an example of a method of determining a layer design for a dielectric coating according to embodiments of the disclosure, FIG. 7 schematically illustrates an example of zeros of spectral coefficients $f_1$ and $f_2$ in the complex wavenumber plane, FIG. 8 schematically illustrates another example of zeros of the spectral coefficients in the complex wavenumber plane, FIG. 9 schematically illustrates an example of an impact of a layer thickness variation of the dielectric coating on the zeros of the spectral coefficient $f_1$ in the complex wavenumber plane.

FIG. 6 is a flowchart schematically illustrating an example of a method 600 of determining a layer design for a dielectric coating according to embodiments of the disclosure. As noted above, the dielectric coating comprises a plurality of stacked layers, e.g., stacked on a substrate.

At step S610, a plurality of layer designs are determined that are in conformity with a desired optical property of the dielectric coating. The desired optical property may be a certain spectral reflectance, for example.

At step S620, a metric Z is determined for each of the layer designs. The metric Z depends on the total optical thickness x of the dielectric coating according to the respective layer design and a bandwidth $\Delta k$ of interest, in terms of wavenumbers, for which the dielectric coating is intended for use. For example, the metric Z may be given by or proportional to $$Z = x \cdot \frac{\Delta k}{\pi},$$

where x is the total optical thickness of the dielectric coating and $\Delta k$ is the bandwidth of interest.

At step S630, that layer design among the plurality of layer designs is selected as a final layer design for the dielectric coating, that has the smallest value of the metric Z.

In the above, a method of determining a phase shift after reflection/transmission by a dielectric coating as well as a method of determining a suitable layer design for a dielectric coating have been described. Using these methods, an example process according to embodiments of the disclosure may unfold as follows:

Step 1: The metric Z is used to select the best coating (i.e., most robust with respect to manufacturing errors, from a phase shift point of view) for which the smallest possible value of the metric Z is achieved given a desired property, e.g., implemented by spectral reflectance specifications. Method 600 may be used to this end.

Step 2: Once the coating design is selected, a sensitivity analysis is used to derive the theoretical wavenumber shift $\delta k_{(e)}$ performed with the known thickness error (which may be provided by the manufacturer). A normalized cross-correlation function $C(\delta k)$ of the as-designed phase and tolerated coating's phase may be used, where $\delta k_{(e)}$ corresponds to the maximum $C_{max}$ of C. This theoretical wavenumber shift can serve as an estimate of the wavenumber shift. Step S210 in method 200 may be used to this end.

Step 3: The calculated/estimated wavenumber shift $\delta k_{(e)}$ is then used for the selection of two wavelengths $\lambda_1$ and $\lambda_2$ (corresponding to wavenumbers $k_1$, $k_2$) to be implemented in the wave front error measurements to be made on the coating (flight or flight representative). The wavelengths $\lambda_1$ and $\lambda_2$ should comply to the condition $\chi = R(\lambda_1) \cdot \lambda_1 - R(\lambda_2) \cdot \lambda_2 \approx 0$ to ensure the accuracy of the reconstruction of the wave front for any arbitrary wavelength $\lambda$. The term $R(\lambda)$ is a remainder term of the Taylor expansion of the as-designed phase shift of the coating. Step S120 in method 100 or step S220 in method 200 may be used to this end.

Step 4: The wave front maps (WFE maps) in reflection/transmission for wavelengths $\lambda_1$ and $\lambda_2$ are measured for the as-manufactured coating.

Step 5: The two maps (l, (k)) needed for the reconstruction of the reflected/transmitted wave front are derived from the measured WFE maps. If the calculations are correctly done, the map l is the map of the polished bare substrate of the coating. Step 130 of method 100 may be used to this end.

Step 6: The wave front reflected/transmitted for any arbitrary wavelength $\lambda$ can be derived using the (l, $\delta k$) maps.

Step 7: If needed, the maps (l, $\delta k$) can be fine-tuned to adjust the root mean square (RMS) of reconstructed wave front maps to the RMS of measured maps. Method 400 may be used to this end.

The reconstructed wave front maps can be used to retrieve the final performance of an optical system including a dielectric coating. For example, the optical system can be an imaging system, a spectrometer, an interferometer, etc. However, any optical application using dielectric coatings can profit from the methods and procedures of the present disclosure.

The accuracy of the reconstruction depends on the accuracy of the WFE measurement, the value of $\chi$ (the lower the better), and the intrinsic error of the approximation of the as-manufactured coating phase shift by a shift of the as-designed phase shift.

The only inputs needed from the coating manufacturer are the as-designed coating's phase shift $\phi_c$, for example at normal incidence $\theta = 0$. For other angles of incidence $\theta$ there are two possibilities: Either to reconstruct the characteristic matrix of the as-designed coating, or to obtain the as-designed coating phase shift for discrete values of the angle of incidence $\theta$ (as many as necessary). For reconstructing the characteristic matrix, the following information is needed: the total mechanical thickness of the coating, the materials used in the coating (i.e., their optical properties, e.g., indexes of refraction), and the total mechanical thickness of each material in the as-designed coating.

In the remainder of this disclosure, the phase shift in reflection induced by the dichroic coating of Euclid's Bridge Dichroic Model (BDM) will be described as an example.

In the context of this example, first, it will be checked that the conditions of applicability and accuracy of the model described above are met.

As discussed above, the spectral behavior of the phase changes dramatically when the zeros of the functions $f_1$ and $f_2$ move from the upper half-plane to the lower half-plane in the complex ($\sigma$; k) plane. Thus any sign changes in any zeros will have a detectable impact on the curve $\phi(k)$. The simplest tool available to check whether any changes occur is the normalized cross-correlation factor $C(\delta k) = (\phi_{perturbed} * \phi_{design})(\delta k)$ between the phase $\phi_{perturbed}$ of the coating stack with thickness errors and the as-designed phase curve $\phi_{design}$. At the same time, the maximum value of $C(\delta k_{max})=C_{max}$ provides an estimate $\delta k_{max}$ of the wavenumber shift for a given thickness error of the layers.

A sensitivity analysis of the phase versus the layers' thickness error has been performed. The analysis is divided in two steps: First, a constant change of thickness is applied to each layer of the coating stack. The values selected for the change are, e.g., 0.2%, 0.5%, 1% and 3%. Second, a Monte-Carlo analysis is performed in which the thickness of each individual layer departs randomly from its as-designed value with a standard deviation of ±0.3%. This procedure may be used for estimating the wavenumber shift in step S210 of method 200, for example.

Figure 14:
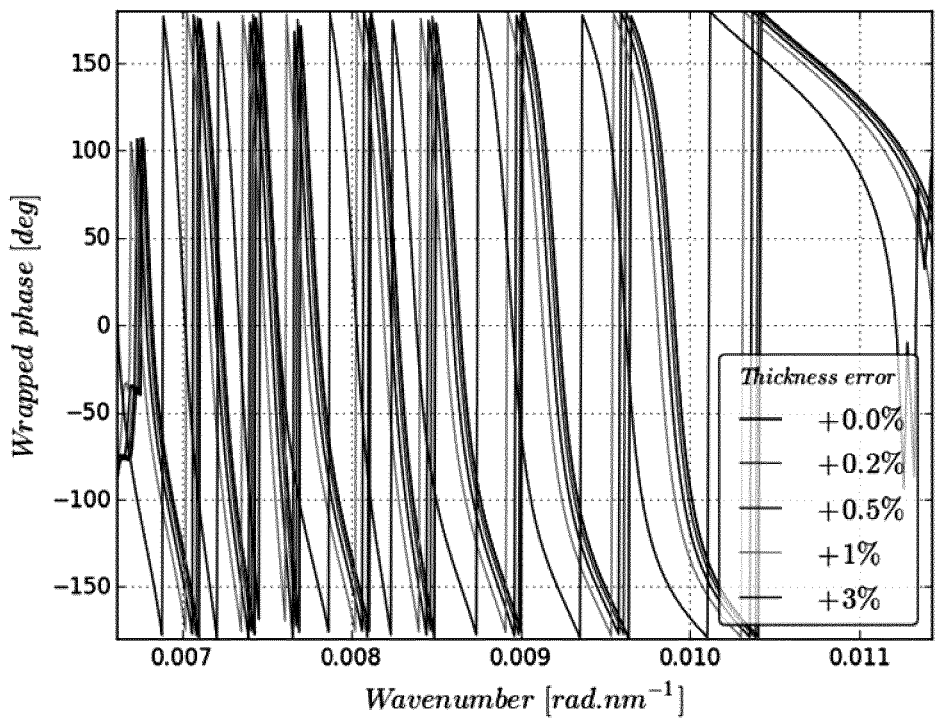
FIG. 14 is a graph illustrating an example of a wrapped phase for different thickness errors as a function of wavenumber.

The outcome of the sensitivity analysis is illustrated in FIG. 14, which shows the wrapped phase for different thickness errors, for $\lambda \in [550$ nm, 900 nm$]$. From this figure, it can be concluded that a positive relative increase of the coating stack thickness induces a positive wavenumber shift $\delta k_{max}>0$. By symmetry it is assumed that, for thinner coating stacks, one would obtain $\delta k_{max}<0$.

Figure 15:
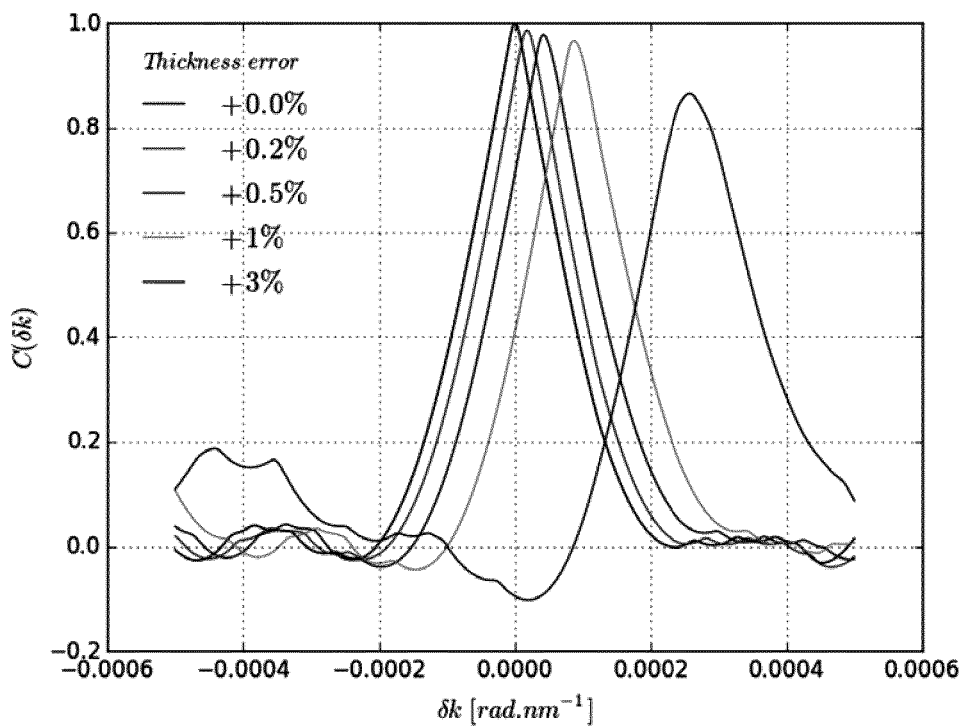
FIG. 15 is a graph illustrating an example of a normalized cross-correlation factor for different thickness errors as a function of wavenumber shift.

Next, the first step of the sensitivity analysis will be described. For each case, the factor $C(\delta k)$ is calculated for different values of $\delta k$. The result is shown in FIG. 15, which shows the normalized cross-correlation factor $C(\delta k)$ at different thickness errors, for $\lambda \in [550$ nm, 900 nm$]$.

Figure 16:
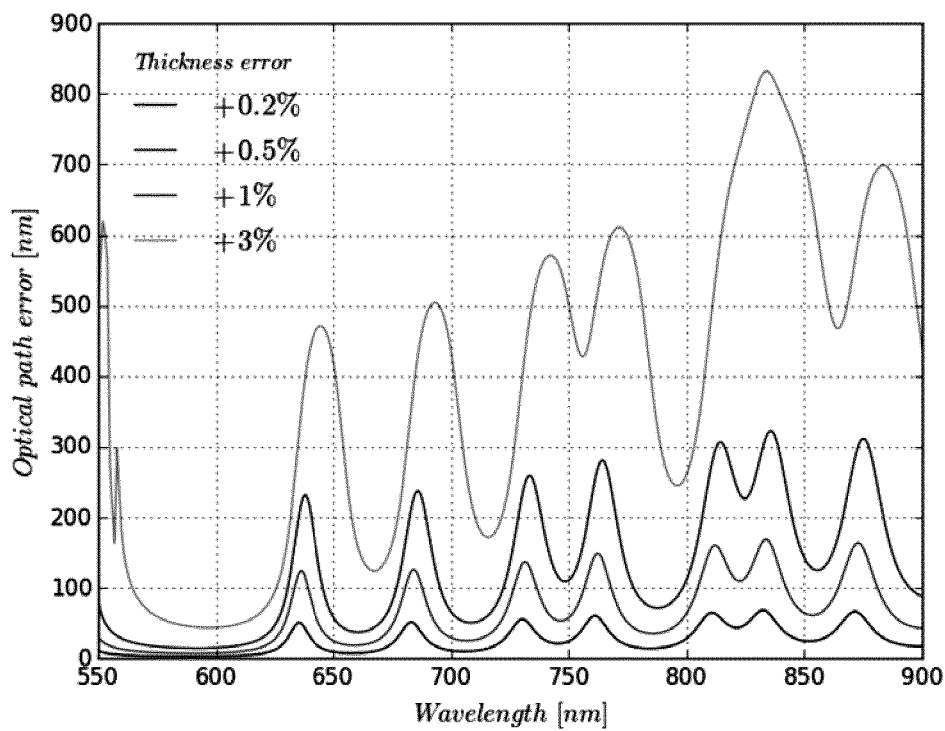
FIG. 16, FIG. 17, and FIG. 18 are graphs showing examples of a calculated optical path error as a function of wavelength.
Figure 17:
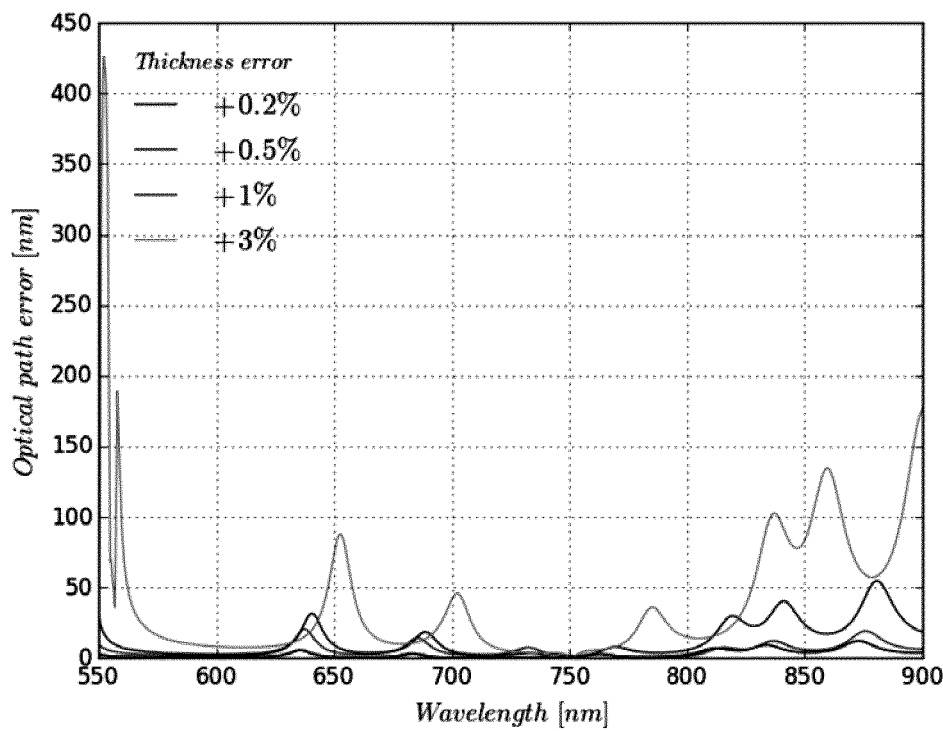

For a change of thickness of 0.2%, $C_{max} \approx 0.986$ is found. $C_{max}$ drops quickly with the thickness error. Without applying the method described in the present disclosure, the difference between the as-designed phase shift and the phase shift of the perturbed coating stack can be tremendous, depending of course on the thickness error. This is illustrated in FIG. 16, which shows the optical path error (OPE) calculated as $OPE=(\phi_{as\ designed}(k)-\phi_{as\ perturbed}(k))/k$ as a function of wavelength. For instance, for an error of 0.2%, the mean difference of OPE between the as-designed and as-perturbed coating is 22 nm; the absolute values of the OPE can be higher. Applying the wavenumber shift $\delta k_{max}$, the OPE difference is significantly reduced. For 0.2%, the mean OPE is 2 nm. This is illustrated in FIG. 17 which shows the OPE calculated as $OPE=(\phi_{as\ designed}(k+\delta k_{max})-\phi_{as\ perturbed}(k))/k$ as a function of wavelength.

Figure 18:
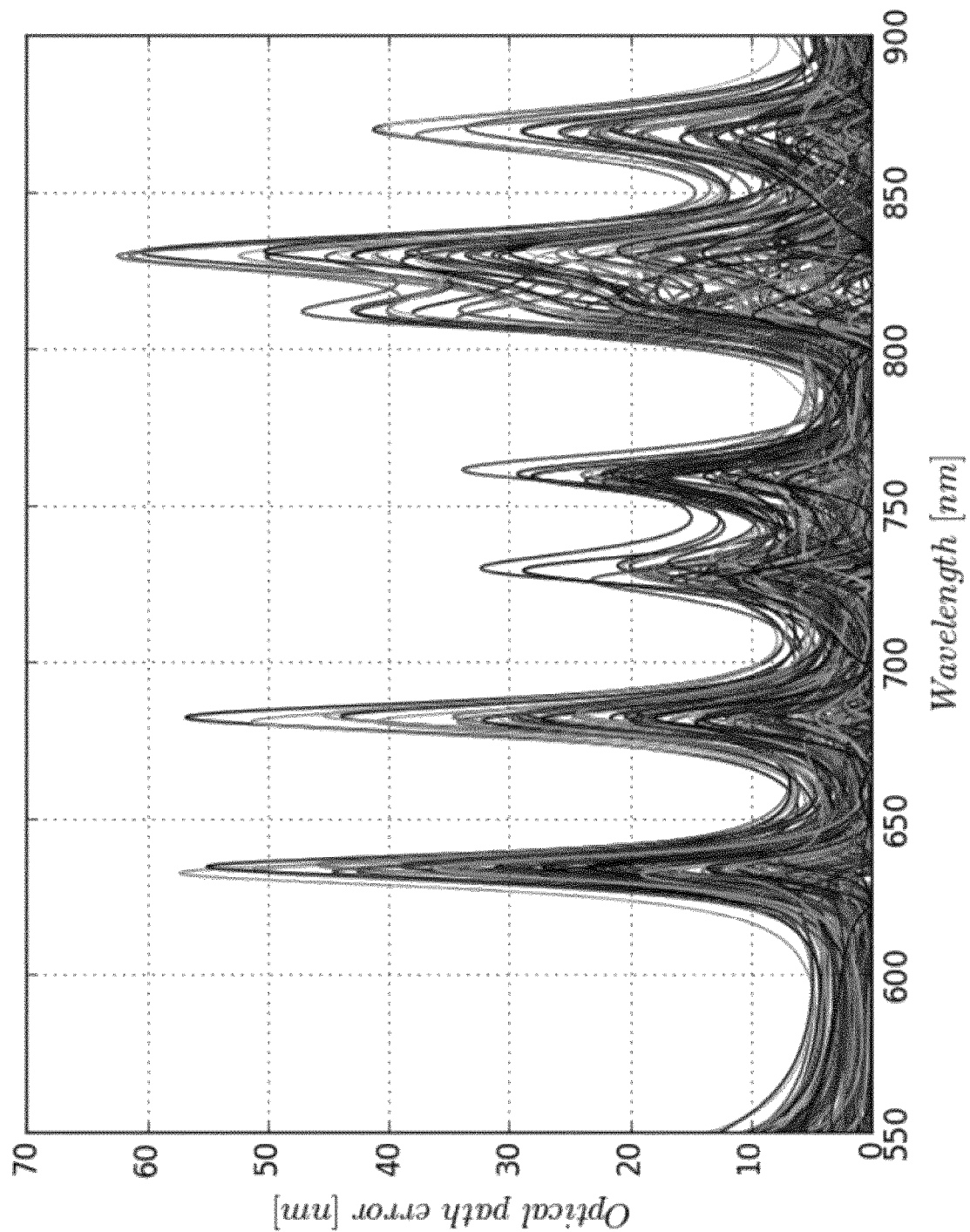

Next, the second step of the sensitivity analysis will be described. The OPE for 200 runs of the Monte-Carlo analysis is shown in FIG. 18, which shows the OPE as a function of wavelength. The absolute OPE can reach very high values (e.g., >60 nm) in some cases. The model accuracy is thus highly dependent on which layers are the most perturbed. However, the averaged (or mean) $\overline{OPE}$ over the band $\lambda \in [550$ nm; 900 nm$]$ amounts to 5 nm±2 nm and $\overline{OPE} \leq 12$ nm.

Figure 19:
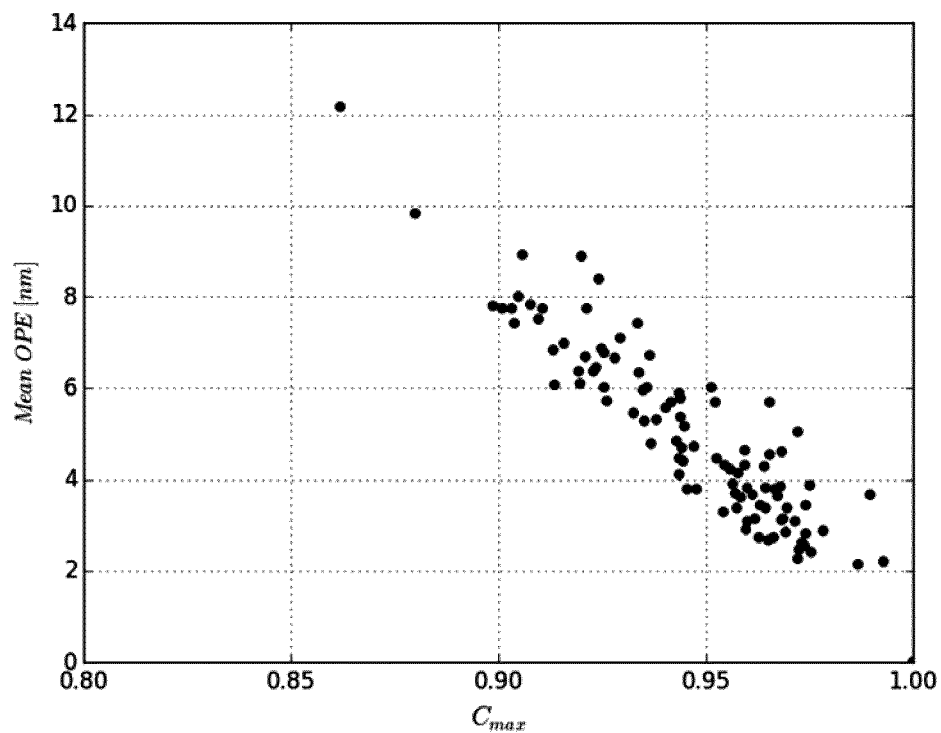
FIG. 19 is a graph showing an example of an averaged optical path error as a function of a maximum of the cross-correlation function.

It is worth noticing that OPE is correlated to $C_{max}$. This is illustrated in FIG. 19, which shows the mean OPE, $\overline{OPE}$, for different values of $C_{max}$ with $$\overline{OPE} = \frac{1}{N_\lambda} \cdot \sum_{\lambda=550\ nm}^{900\ nm} OPE(\lambda).$$

Figure 20:
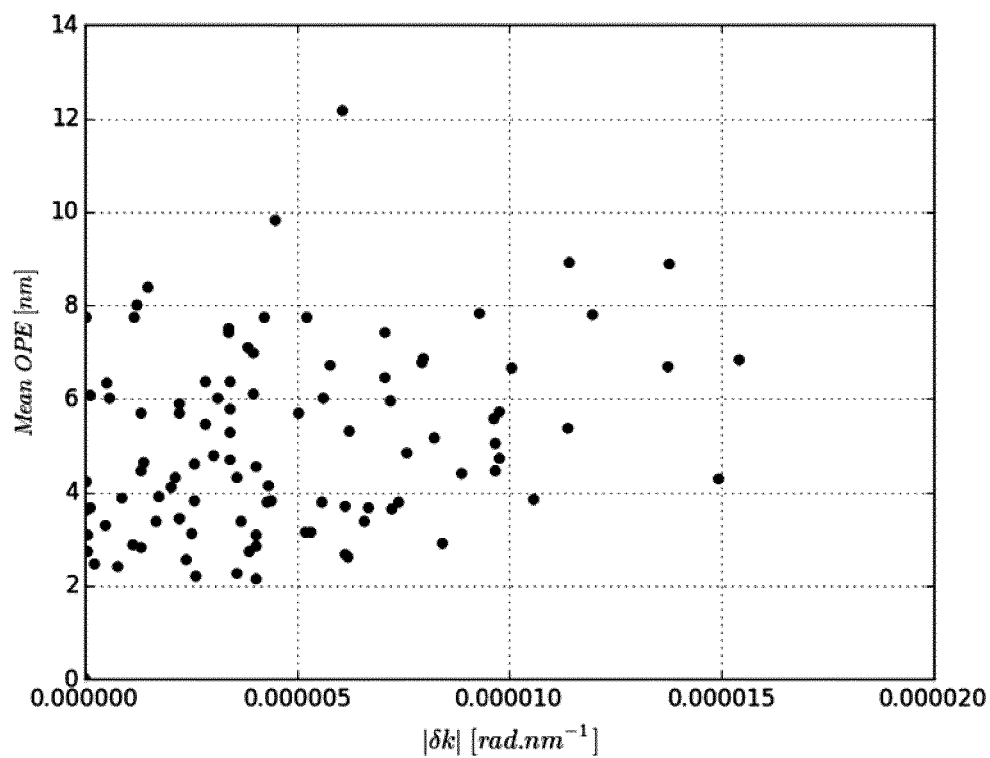
FIG. 20 is a graph showing an example of an averaged optical path error as a function of the wavenumber shift.

The correlation with $\delta k_{max}$ is less obvious. This can be seen from FIG. 20, which shows the mean OPE, $\overline{OPE}$ for different values of $\delta k_{max}$.

Next, a summary of results of the sensitivity analysis will be provided. A constant change in the layer thickness is not necessarily the worst case scenario. For instance, for ±0.3%, the error is about the same size as for +0.5%. Therefore, the sensitivity analysis shall only be performed with a Monte-Carlo analysis with a large number of runs (e.g., >200). The results are summarized in Table 1 below.

TABLE 1

| Tolerance error [%] | $\overline{OPE}$ [nm] | $C_{max}$ | $\delta k$ [rad · nm$^{-1}$] |
|---|---|---|---|
| 0.2 | 2.1 | 0.986 | $1.78 \cdot 10^{-5}$ |
| ±0.3 | 4.9 ± 2 | 0.937 ± 0.01 | $-1.54 \cdot 10^{-5} \leq \delta k \leq 1.38 \cdot 10^{-5}$ |
| 0.5 | 4.8 | 0.977 | $4.18 \cdot 10^{-5}$ |
| 1.0 | 10.2 | 0.967 | $8.68 \cdot 10^{-5}$ |
| 3.0 | 36.7 | 0.865 | $2.58 \cdot 10^{-4}$ |

Next, conditions on bias sources in the phase shift calculation will be described. The above condition $|\epsilon| \ll 1$ can be rewritten as $$|\epsilon| = \left|\frac{x}{x'} - 1\right| \ll 1.$$

In the worst case, all the layers of the as-manufactured coating stack would have their thickness changed by 0.5% (as typically guaranteed by dichroic manufacturers). Thus, $|\epsilon|=1/200$ in this case.

The above condition $\delta k_{max}/k_j \ll 1$ is aimed to eliminate a source of bias in the phase calculation. The estimated value $\delta k_{max}=4.18 \times 10^{-5}$ rad·nm$^{-1}$ is used to assess the ratio $\delta k_{max}/k_j$ which is linear with $\lambda$. Thus, one finds $$0.0033 \leq \frac{\delta k_{max}}{k_j} \leq 0.0063 \text{ for } 500\ nm \leq \lambda \leq 950\ nm.$$

The limitation to the spectral band of interest can be made since the contribution of the zeros $\mu_j$ or $v_j$ to the total phase shift decreases with increasing $k_j$.

Figure 21:
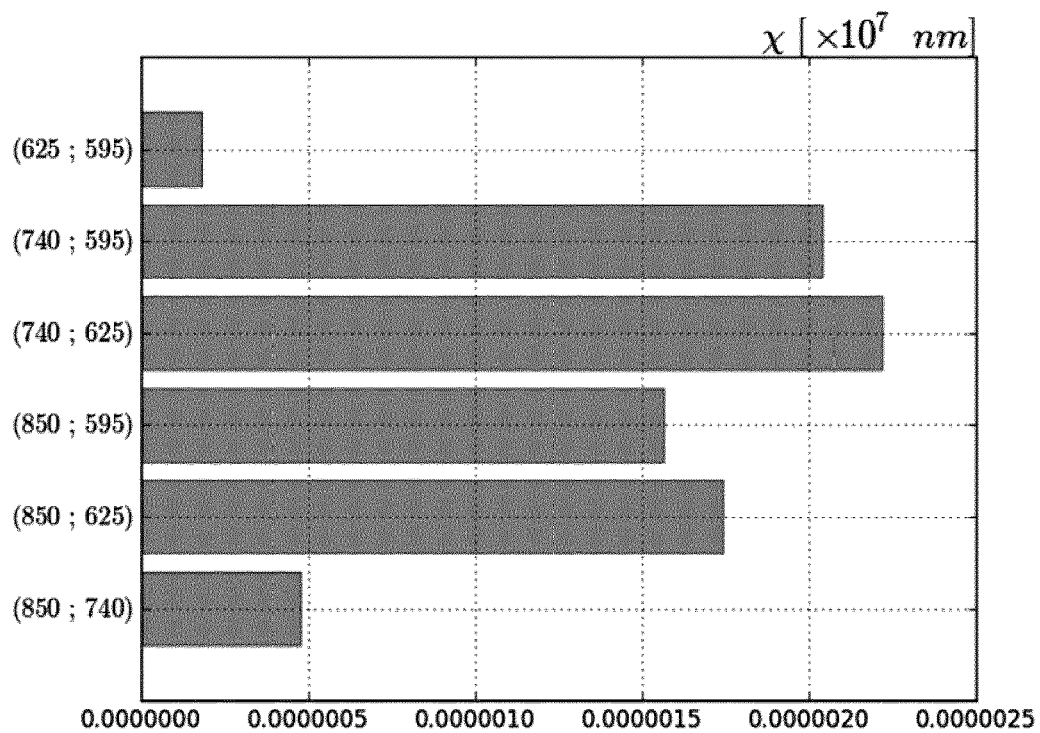
FIG. 21 and FIG. 22 show phase residuals for different wavelength pairs at which measurements are performed.
Figure 22:
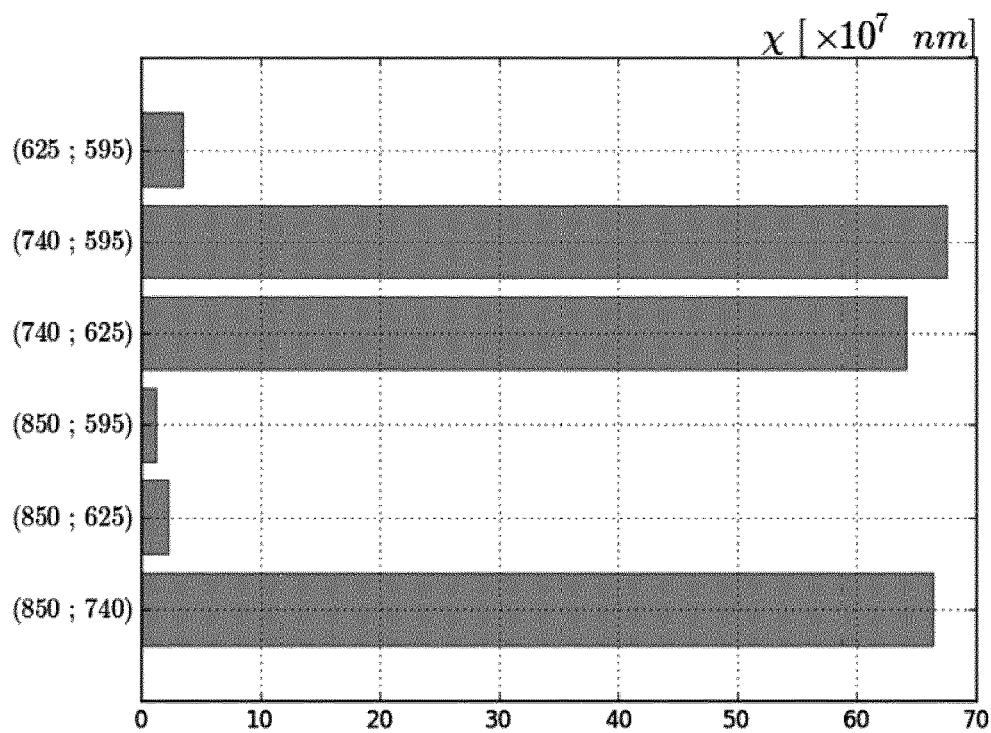

Next, conditions on the choice of wavelengths $\lambda_1$ and $\lambda_2$ (corresponding to wavenumbers $k_1$ and $k_2$, respectively) will be described. The phase residual $\chi$ defined in Eq. (9) is assessed in FIG. 21 for different pairs of wavelengths ($\lambda_1$; $\lambda_2$) for $\delta k=4.18\cdot 10^{-5}$ rad·nm$^{-1}$. This value of $\delta k$ corresponds to $C_{max}$ for a thickness error of 0.5%. The smallest absolute value of the phase residual $\chi$ is achieved for ($\lambda_1=625$ nm; $\lambda_2=595$ nm). However, when applying all possible pairs of wavelengths to the reconstruction process, it is consistently found that $\delta k \approx 10^{-3}$ rad·nm$^{-1}$ on average. FIG. 22 shows the phase residual $\chi$ for different pairs of wavelengths ($\lambda_1$; $\lambda_2$) for $\delta k=10_{-3}$ rad·nm$^{-1}$. As noted above, there is no correlation between the reconstruction error and the value of $\delta k$. It seems that the actual thickness errors are distributed such that $\delta k$ is much larger than calculated in the sensitivity analysis. From FIG. 21 and FIG. 22 it can be seen that the wavelength pair ($\lambda_1=625$ nm; $\lambda_2=595$ nm) provides systematically low values of $\chi$ when compared to the others possibilities. However, due to measurements biases for $\lambda=625$ nm (see below), this wavelength pair may be disfavored.

When using the value $\delta k \approx 10^{-3}$ rad·nm$^{-1}$, the optimum wavelength pair is another one and the results of the reconstruction are much better. In the following, $\lambda_1=850$ nm, $\lambda_2=595$ nm will be used for the present example.

Next, a simplified model will be described. Eq. (14) can be applied to both polarizations. The wavenumber shift $\delta k_\theta$ to be applied to account for the angle of incidence $\theta$ will be different depending on the polarization. Thus the phase shift must be determined for the two polarizations independently for a given angle of incidence $\theta_0$ so that the terms $\delta k_{TM}(\theta_0)$ and $\delta k_{TE}(\theta_0)$ can be determined.

The phase shift of the coating as manufactured is thus provided by $$\phi_c'(k,\theta,P) = \phi_c(k+\delta k_M+\delta k_\theta(P),0) \quad (15)$$

with P being the polarization (TM or TE), $\delta k_M$ being the wavenumber shift caused by manufacturing errors (as determined, e.g., in step S130 of method 100), and $\delta k_\theta(P)$ being the wavenumber shift caused by the angle of incidence for the polarization P.

Figure 23:
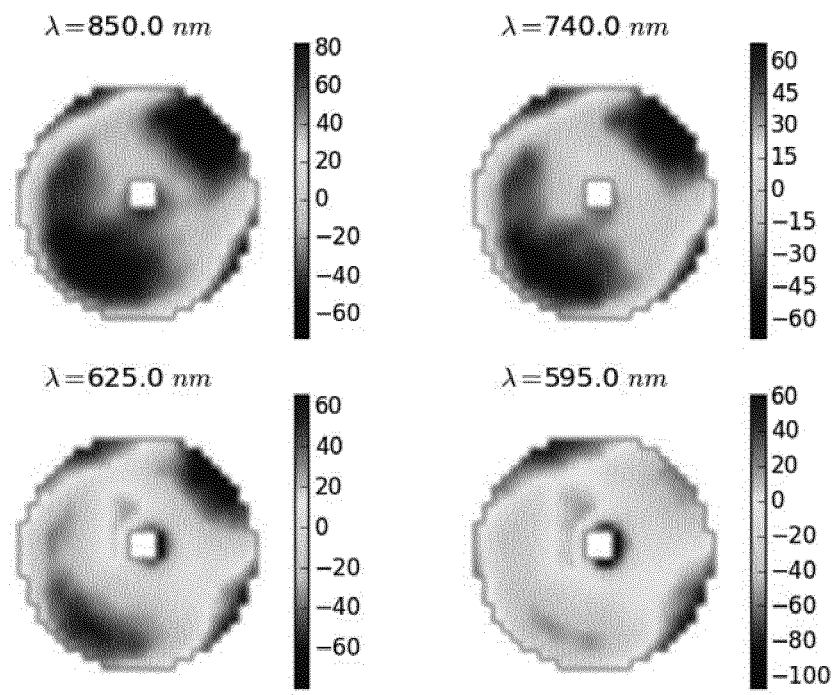
FIG. 23, FIG. 24, and FIG. 25 show examples of wave front error maps measured at different wavelengths.

Next, results of measurements and WFE reconstruction in the context of the present example will be described. Several measurements of WFEs in reflection at normal incidence ($\theta=0$ rad) were performed at the following wavelengths: 850 nm, 740 nm, 625 nm, and 595 nm. The measured WFE maps in reflection are shown in FIG. 23.

A Zernike analysis of the WFE maps shows that there is a significant remnant focus for $\lambda=850$ nm. Results of this analysis are summarized in Table 2, which shows focus terms (Zernike fringe definition) in the measured WFE maps.

TABLE 2

| Wavelength [nm] | 850 | 740 | 625 | 595 |
|---|---|---|---|---|
| Focus term [nm] | −13.04 | −5.34 | 1.65 | −5.55 |

It can be concluded that the remnant defocus term added in the l map is about $$\frac{|-13.04-5.55|}{2\sqrt{3}} \approx 5.4 \text{ nm RMS}.$$

Figure 24:
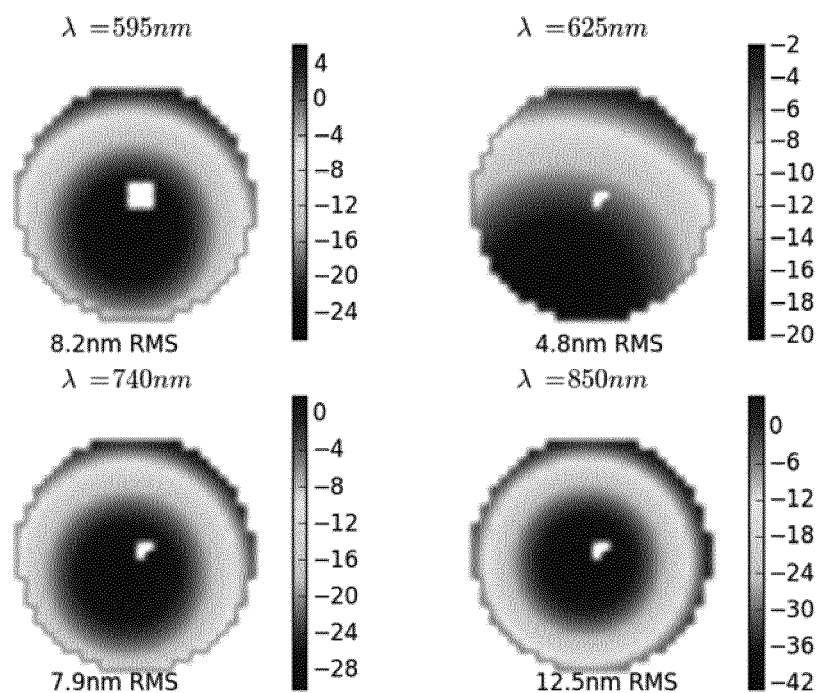

Also, an analysis on the maps difference $WFE_{with\ focus} - WFE_{no\ focus}$ for each wavelength $\lambda$ shows that the difference of focus content in each WFE map is not necessarily due to the coating. Results of this analysis are illustrated in FIG. 24. Indeed, for $\lambda=625$ nm, there is a strong tilt remaining in the map being caused by the test set-up itself. The other WFE maps also have a remnant tilt term but to a lower extent.

Figure 25:
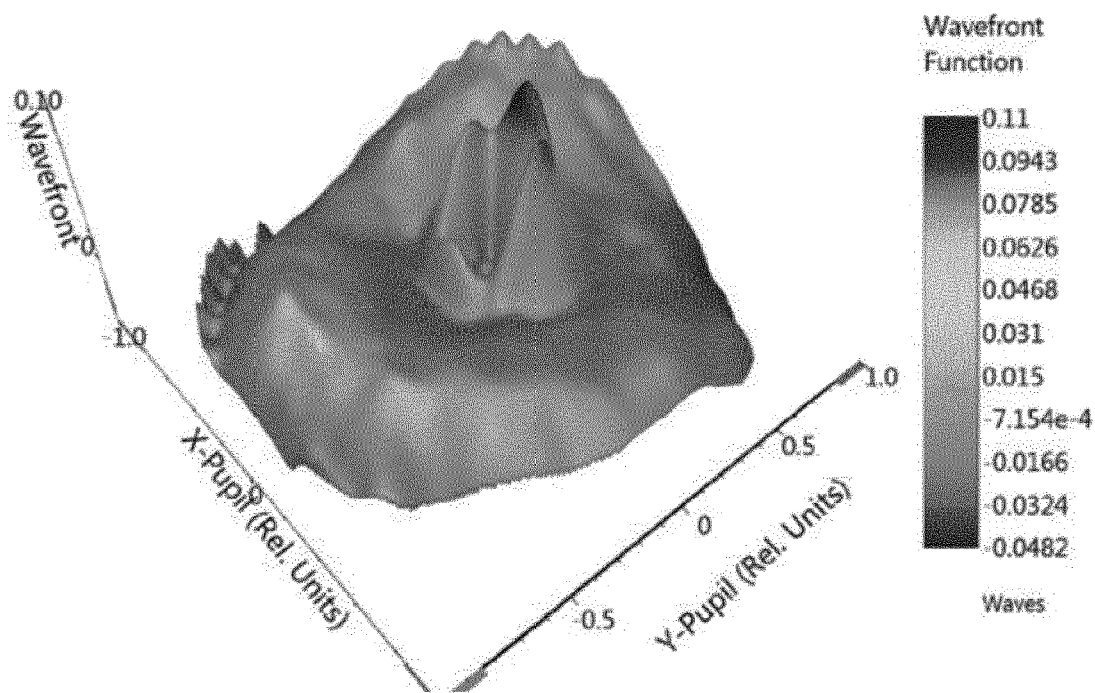

In the WFE maps for $\lambda=595$ nm and $\lambda=625$ nm, some outlier data points are present resulting from the incomplete removal of the ghost signal created by the test set-up. Large WFEs are present locally around the center of the aperture. FIG. 25 shows the WFE map at 595 nm without tilt. The scale is in waves.

Next, the calculation of $\delta k$ and l will be described. To take into account the spectral width of the laser diodes used in the measurements at $\lambda_1$ and $\lambda_2$, the wavelengths listed in Table 3 may be used in the calculations.

TABLE 3

| Theoretical [nm] | Actual [nm] |
|---|---|
| 850 | 843 |
| 740 | 739 |
| 625 | 629 |
| 595 | 612 |

The actual wavelengths are derived from the spectral profile of the laser diodes. The actual wavelengths may be the centroid wavelengths for each source. In the remainder of the present disclosure, reference will be made to the theoretical wavelengths for simplicity. For the calculations, the actual values will be used.

Figure 26:
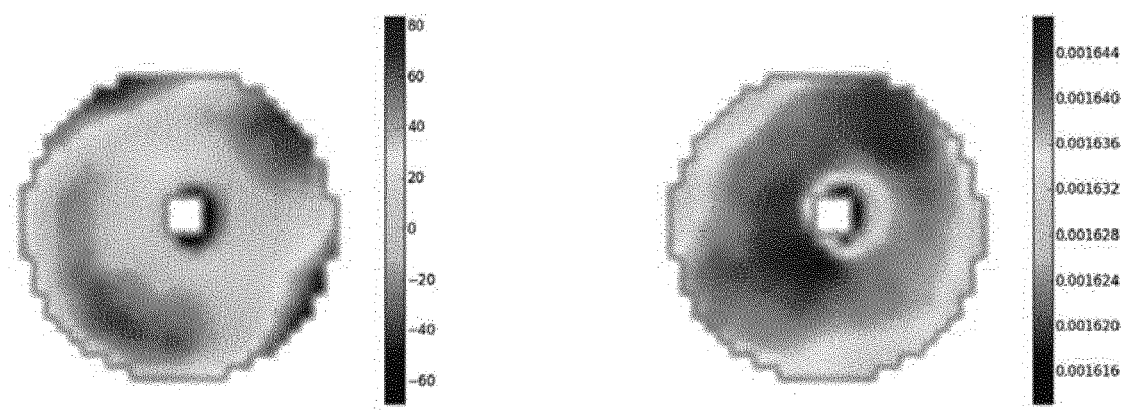
FIG. 26 shows examples of a wavenumber shift ($\delta k$) map and a total optical path difference (l) map.

Applying Eq. (11) for $\lambda_1=850$ nm and $\lambda_2=595$ nm the maps for $\delta k$ and l shown in FIG. 26 can be derived. The left panel shows the $\delta k$ map (units in rad·nm$^{-1}$). The right panel shows the l map (units in nm).

Figure 27:
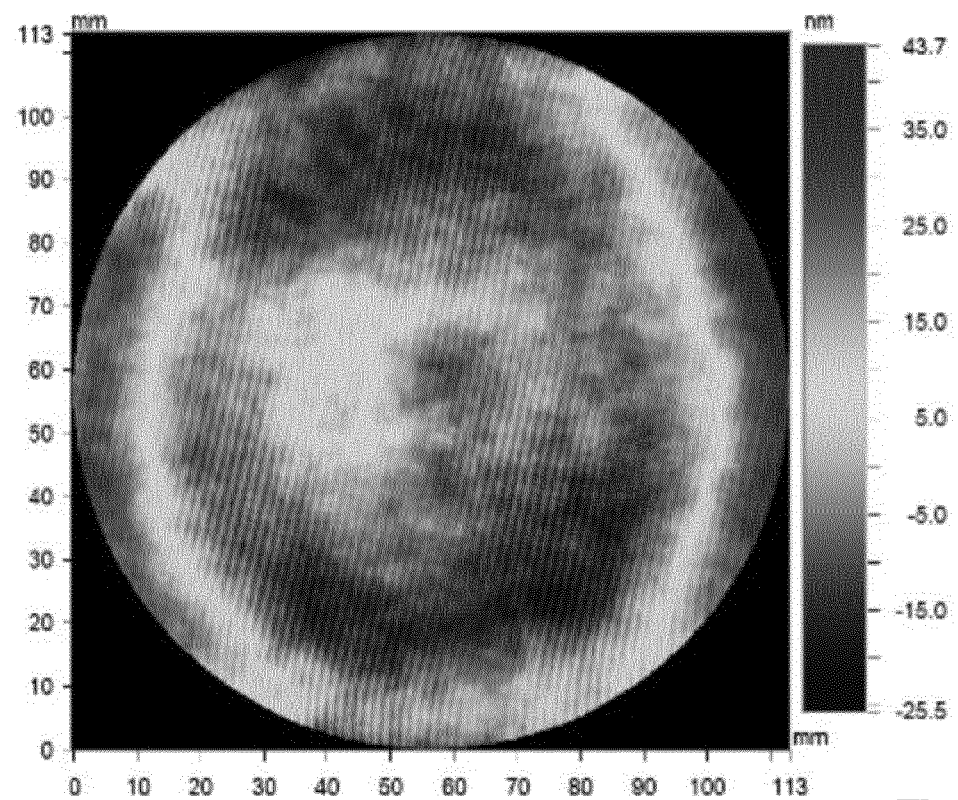
FIG. 27 shows an example of a surface figure error map of a substrate before coating.

The statistics of the surface defects map l are 23.7 nm RMS and 123 nm Peak-to-valley (PtV). It is worth noting that the WFE map l is comparable both in statistics and features to the Surface Figure Error (SFE) map of the bare surface (without coating) measured over a diameter of 113 mm while the l map covers an area of Ø100 mm, giving confidence in the correctness of the calculations. The SFE map of the bare surface is illustrated in FIG. 27. Before polishing, the equivalent WFE is 24.4 nm RMS and 131.6 nm PtV in line with the values for the l map.

Figure 28:
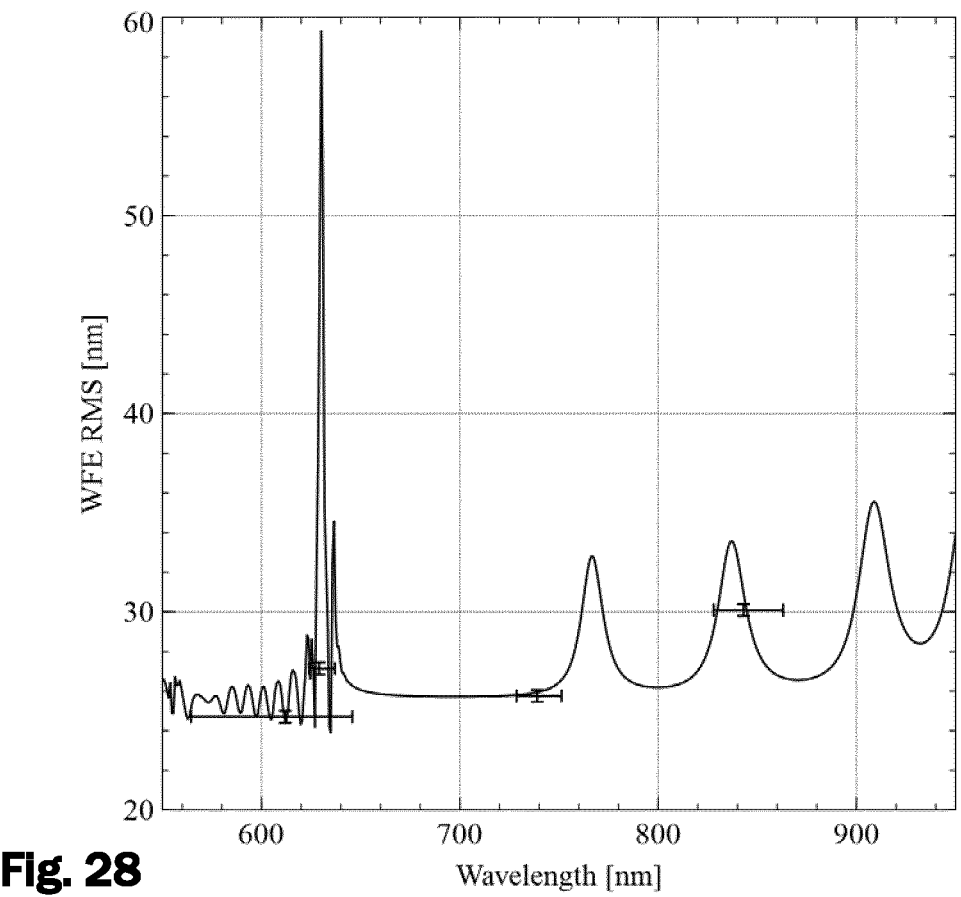
FIG. 28 is a graph showing an example of a reconstructed Root Mean Square (RMS) wave front error and a measured RMS wave front error as functions of wavelength.
Figure 29:
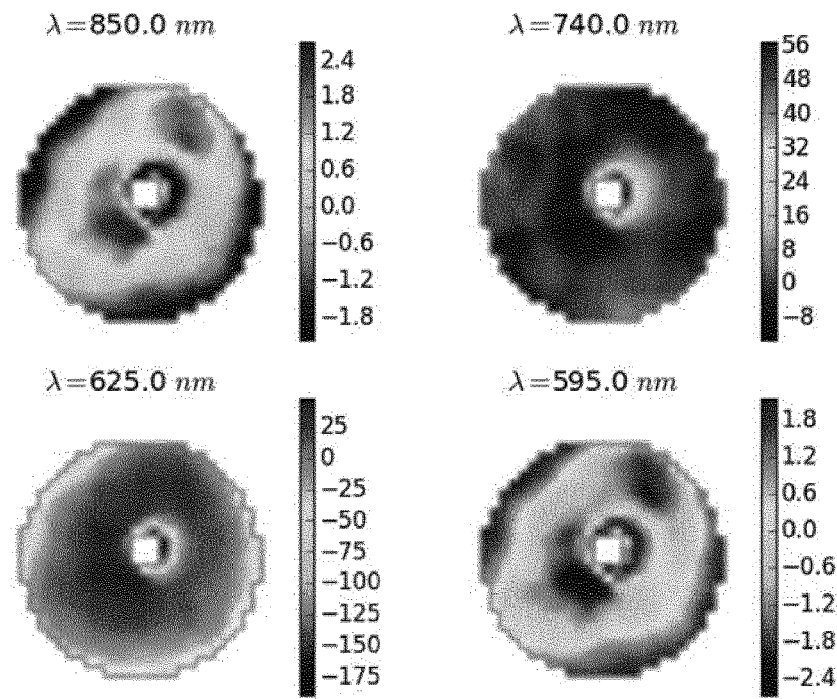
FIG. 29 shows examples of residuals obtained by subtracting reconstructed wave front error maps from measured wave front error maps at different wavelengths.

Next, WFE reconstruction will be described. The RMS values of the WFE maps calculated according to methods of the present disclosure are illustrated in FIG. 28 and FIG. 29. Of these, FIG. 28 shows the RMS WFE as a function of wavelength. FIG. 29 shows the residual maps obtained by subtracting the reconstructed WFE maps from the measured WFE maps. Residual statistics are also summarized in Table 4. These residuals are considered to assess the validity of the WFE map reconstruction according to the present disclosure. Further, Table 5 shows a comparison of RMS and PtV between the reconstructed and the measured WFE maps.

TABLE 4

| Wavelength [nm] | PtV [nm] | RMS [nm] |
|---|---|---|
| 850 | 4.8 | 1.2 |
| 740 | 69.6 | 7.8 |
| 625 | 238.2 | 30.7 |
| 595 | 4.8 | 1.2 |

TABLE 5

| | Measured | | Reconstructed | |
|---|---|---|---|---|
| Wavelength [nm] | PtV [nm] | RMS [nm] | PtV [nm] | RMS [nm] |
| 850 | 154.6 | 30.1 | 157.7 | 31 |
| 740 | 136.4 | 25.8 | 147 | 25.9 |
| 625 | 146.6 | 27.1 | 211 | 42.3 |
| 595 | 167.7 | 24.7 | 164.6 | 24.5 |

Figure 30:
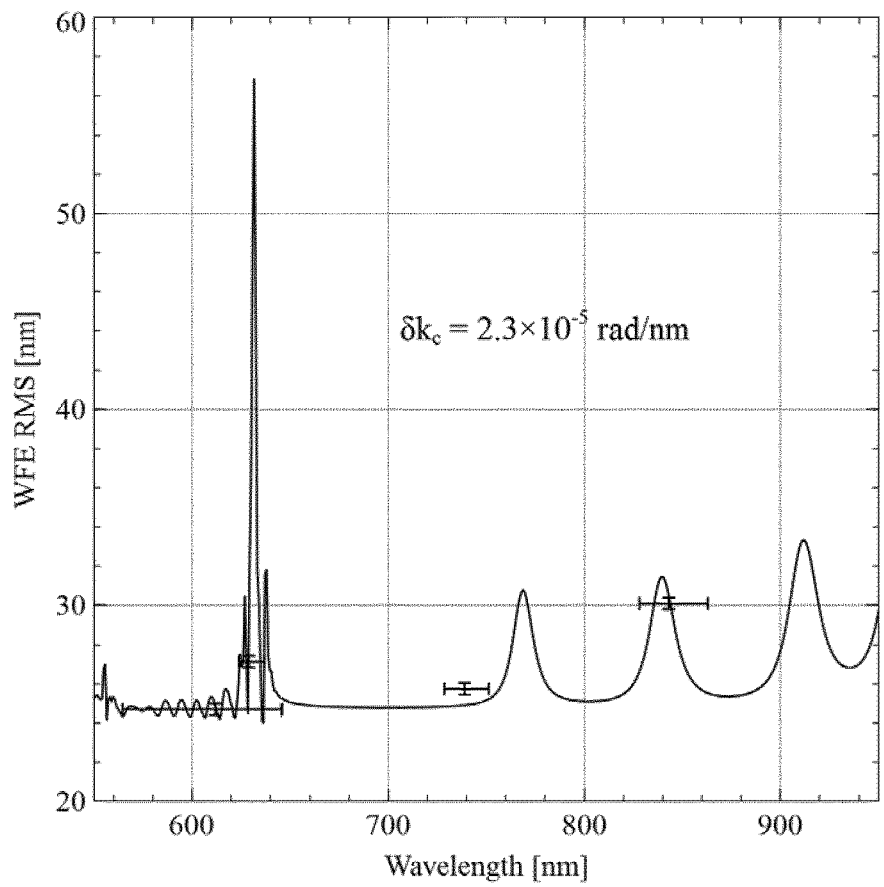
FIG. 30 is a graph showing another example of a reconstructed RMS wave front error and a measured RMS wave front error as functions of wavelength.

Next, fine tuning of the wavenumber shift $\delta k$ will be described. Both in general and in the context of the present example, the condition of Eq. (9) may not be fully met by the wavelengths $\lambda_1$ and $\lambda_2$ that are available for the WFE measurements, thus introducing a bias on $\delta k$. This bias may be compensated by an additive correction term $\delta k_c$ and the map l may be recalculated accordingly. The results for $\delta k_c=2.3\times10^{-5}$ nm$^{-1}$ are illustrated in FIG. 30, which shows the RMS of reconstructed WFE maps as a function of wavelength for $\delta k_c=2.3\times10^{-5}$ nm$^{-1}$. The errors bars along the wavelength axis and RMS WFE axis are respectively given by the full width at half maximum of the diodes used in the measurement and the error budget on the WFE measurement (4 nm RMS). The value of $\delta k_c=2.3\times10^{-5}$ nm$^{-1}$ is a compromise allowing the lowest value for the RMS residuals and the best fit for the RMS of each measured WFE map. In general, the determined wavenumber shift (e.g., determined at step S130 of method 100) may be corrected using a correction term that depends on a deviation of $\chi$ from zero for the wavenumbers $k_1$ and $k_2$ actually used in the measurements.

Figure 31:
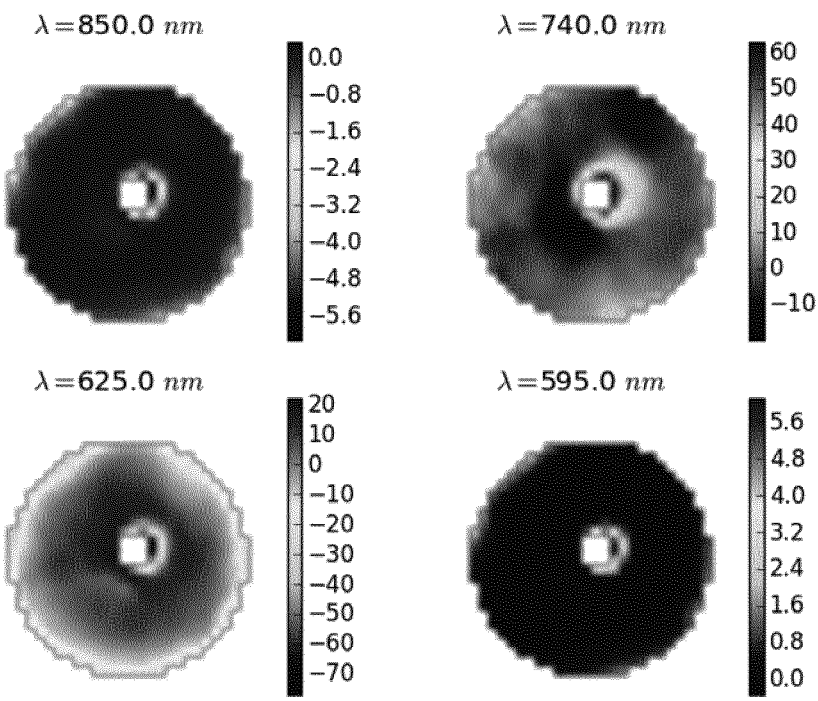
FIG. 31 shows further examples of residuals obtained by subtracting reconstructed wave front error maps from measured wave front error maps at different wavelengths.
Figure 32:
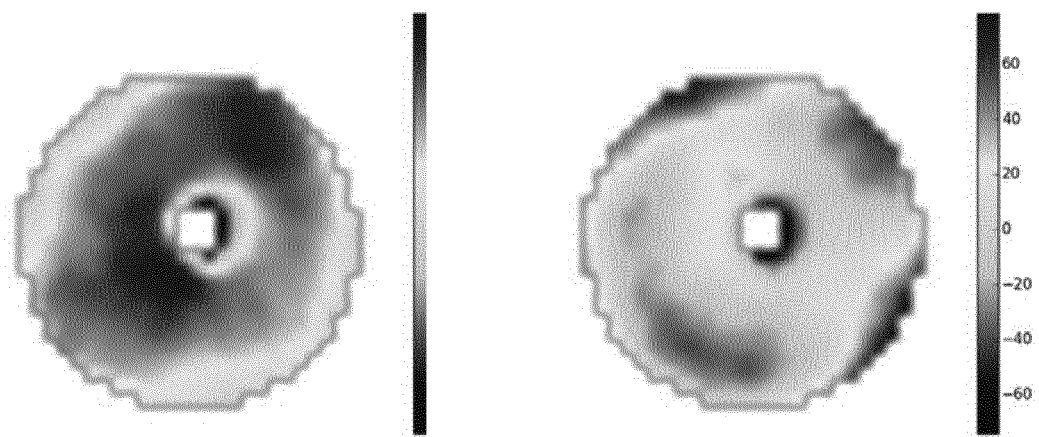
FIG. 32 shows further examples of a wavenumber shift ($\delta k$) map and a total optical path difference (l) map.
Figure 33:
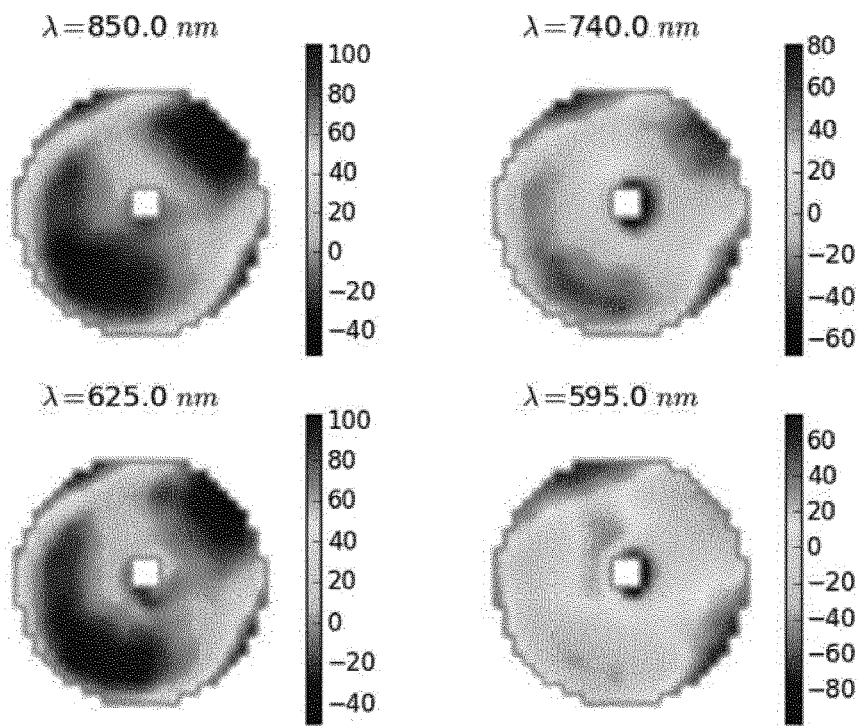
FIG. 33 shows examples of filtered residuals of wave front error maps using a fine-tuned wavenumber shift ($\delta k$)

Next, WFE map reconstruction residuals will be described. Using the fine-tuned δk and l maps, the WFE maps for all the wavelengths in Table 3 are calculated and compared to the measured WFE maps. The statistics of the residuals calculated with the corrected δk are given in Table 6 and Table 7. FIG. 31 shows the residual maps obtained by subtracting the reconstructed WFE maps (using the fine-tuned δk) from the measured WFE maps. FIG. 32 shows the corrected maps for δk (left panel) and l (right panel) without piston. FIG. 33 shows the reconstructed WFE maps (using the fine-tuned δk).

TABLE 6

| Wavelength [nm] | PtV [nm] | RMS [nm] |
|---|---|---|
| 850 | 6.5 | 0.7 |
| 740 | 82.5 | 10 |
| 625 | 99.2 | 12.7 |
| 595 | 6.5 | 0.7 |

TABLE 7

| | Measured | | Reconstructed | |
|---|---|---|---|---|
| Wavelength [nm] | PtV [nm] | RMS [nm] | PtV [nm] | RMS [nm] |
| 850 | 154.6 | 30.1 | 156.2 | 30.5 |
| 740 | 136.4 | 25.8 | 147.4 | 24.9 |
| 625 | 146.6 | 27.1 | 152.9 | 28.3 |
| 595 | 167.7 | 24.7 | 173 | 24.8 |

Next, an appraisal of the model error will be performed. Table 6 provides a first assessment of the WFE reconstruction error. It seems that the residuals are higher than the WFE measurement error for $\lambda=740$ nm and $\lambda=625$ nm. The explanations for these discrepancies are as follows.

Figure 34:
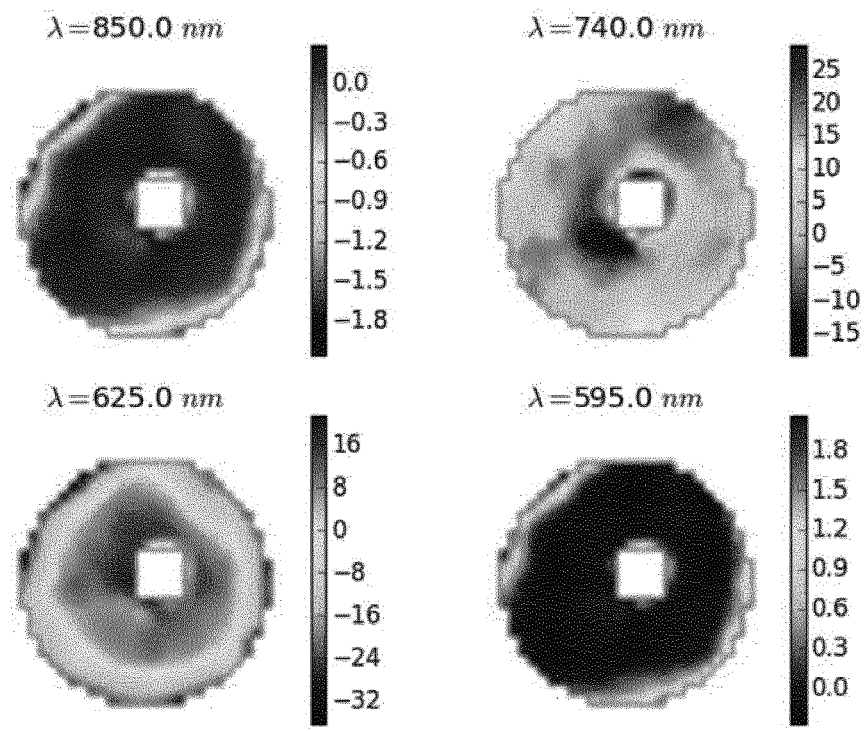
FIG. 34 shows examples of filtered residuals of wave front error maps with outlier points removed.

For $\lambda=740$ nm, the deviation between the reconstructed WFE map and the measured WFE map is driven by a few data points which can be discarded in a Zernike fit of the WFE map. Those deviating points are present in the measured WFE map for $\lambda=595$ nm. However, by removing the outliers in the reconstructed map at $\lambda=740$ nm, the RMS of residuals drops to 6.6 nm RMS and only data points close to the central obscuration are removed. The outlier points are due to an incorrect masking of the ghost signal present in the test setup for $\lambda<940$ nm. FIG. 34 shows the filtered residual maps with outlier points removed.

For $\lambda=625$ nm, the residual has a remnant focus (see FIG. 34) and a strong remnant tilt (FIG. 24) in addition to the outlier points. After removing these points, the RMS of the residual drops to 11.6 nm RMS. As can be seen from FIG. 24, the focus introduced in the map l is about 10 nm RMS. Removing this focus bias from the residual map and the focus from the measured map will lead to a residual of 3.5 nm RMS. Taking into account the 4 nm RMS measurement accuracy, the final residual amounts to 5.3 nm RMS.

In summary, the present disclosure provides a method for reconstructing the phase of a wave front in reflection or transmission at a dielectric coating for arbitrary wavelength $\lambda$. From this method, a simplified model is derived by combining Eq. (1) and Eq. (15), yielding $$\phi_r(k,\theta,P)=k\cdot l\cdot \cos\theta+\phi_c(k+\delta k_M+\delta k_c+\delta k_\theta(P),0) \quad (16)$$

The proposed model is valid for any design of the dielectric coating (e.g., dichroic). Only the parameter values will change with the design.

As an example, this simplified model is applied to the dichroic coating as-designed for Euclid's BDM. The phase in reflection in the visible channel is derived. Parameter values for the BDM dichroic are given in Table 8.

TABLE 8

| Parameter | Unit | TE | TM |
|---|---|---|---|
| $\delta k_c$ | rad · nm$^{-1}$ | | $2.3 \cdot 10^{-5}$ |
| $\delta k_{\theta_0}$ | rad · nm$^{-1}$ | $-4.666 \cdot 10^{-5}$ | not available |
| $\theta_0$ | degrees | | 12 |

$\delta k_M$ and l are determined from WFE measurements performed at $\lambda_2=595$ nm and $\lambda_1=850$ nm and with an additive correction $\delta k_c$. The term $\delta k_\theta(P)$ is calculated using Eq. (14).

For further and more accurate reconstruction, it is recommended to first "clean" the measured WFE maps before calculating the $\delta k_M$ and l maps. The residual tilt and outlier data points should be removed from the WFE maps.

In addition, the as-designed phase shift at an angle $\theta_0>0°$ should be used to derive $\delta k_{\theta_o}$ so as to reduce the error on the calculated phase shift.

It should be noted that the method features described above correspond to respective apparatus, system and computer program features that may not be explicitly described, for reasons of conciseness, and vice versa. The disclosure of the present document is considered to extend also to such apparatus, system, and computer program features, and vice versa. For example, such apparatus or system may be adapted (e.g., via an appropriately configured processor) to perform any or each of the steps described above, and such computer program may be adapted to cause a processor to perform any or each of the steps described above. The present disclosure should further be construed to be related to a non-transitory computer-readable medium storing such computer program.

It should further be noted that the description and drawings merely illustrate the principles of the proposed method and system. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method and system. Furthermore, all statements herein providing principles, aspects, and embodiments of the invention, as well as specific examples thereof, are intended to encompass equivalents thereof.

Various embodiments described above can be combined to provide further embodiments. All of the non-patent publications referred to in this specification are incorporated herein by reference, in their entirety. Aspects of the embodiments can be modified, if necessary to employ concepts of the various publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

REFERENCES

Abeles F. Recherches sur la propagation des ondes electromagnetiques sinusoidales dans les milieux stratifies. Application aux couches minces, Annales de physique.—1950.—Vol. 5.

Amotchkina Tatiana V. [et al.] Quality control of oblique incidence optical coatings based on normal incidence measurement data, Optics Express.—2013.—18 Vol. 21.—p. 21508.

Baumeister P. W., Jenkins F. A. and Jeppesen M. A. Characteristics of the Phase-Dispersion Interference Filter, Journal of the Optical Society of America.—1959.—Vol. 49.—p. 1188.

Baumeister Philip W. Optical coating technology, Washington: SPIE, 2004.

Born M. and Wolf E. Principles of Optics, Cambridge University Press, 1999.—7th: pp. 54-74.

Furman Sh. A. and Tikhonravov A. V. Basics of optics of multilayer systems, Gif-sur-Yvette: Edition Frontieres, 1992.

Lichten W. Precise wavelength measurements and optical phase shifts. I. General theory, Journal of the Optical Society of America A.—1985.—Vol. 2.—p. 1869.

Mouchart J. Thin film optical coatings: 1. Optical coating stabilities, Applied Optics.—[s.l.]: Optical Society of America, 1977.—Vol. 16.—pp. 2486-2490.

Oreb B. F. [et al.] Characterization of wavefront variations in coated optics, SPIE.—1999.—Vol. 3782.—pp. 232-243.

Strojnik A. V. Effect of the coating-thickness error on the performance of an optical component, SPIE.—1995.—Vol. 2553.—pp. 557-565.

Tikhonravov A. V. Some theoretical aspects of thin-film optics and their applications, Applied Optics.—October 1993.—28: Vol. 32.—pp. 5417-5426.

Tikhonravov A. V, Baumeister P. W. and Popov K. V. Phase properties of multilayers, Applied Optics.—1997.—Vol. 36.—p. 4382.

The invention claimed is:

1. A method of determining a phase shift caused by reflection at, or transmission through, a dielectric coating as a function of wavenumber, the method comprising:
    obtaining a nominal phase shift for the dielectric coating as the function of wavenumber, wherein the nominal phase shift is a known phase shift that is applied to a wave front in reflection or transmission by the dielectric coating as designed;
    determining a first wavenumber and a second wavenumber for performing measurements of phase shift at the first and second wavenumbers, based on the nominal phase shift;
    determining a wavenumber shift based on a first measurement of phase shift at the first wavenumber, a second measurement of phase shift at the second wavenumber, and the nominal phase shift as the function of wavenumber;
    determining a first contribution to the phase shift as the function of wavenumber, the first contribution depending on thickness variations of stacked layers of the dielectric coating from their respective nominal thickness;
    determining a second contribution to the phase shift as the function of wavenumber, the second contribution depending on local deformation of the dielectric coating due to substrate deformation;
    determining the phase shift as the function of wavenumber based on the wavenumber shift and the nominal phase shift, wherein the phase shift as the function of wavenumber is based on a sum of the first contribution and the second contribution; and
    outputting the determined phase shift as the function of wavenumber.

2. The method according to claim 1, further comprising:
    determining an estimate of the wavenumber shift based on a simulation of a deviation of the dielectric coating from an as-designed configuration thereof,
    wherein determining the first wavenumber and the second wavenumber is further based on the estimate of the wavenumber shift.

3. The method according to claim 1, further comprising:
    determining the first contribution by shifting the nominal phase shift as the function of wavenumber by the wavenumber shift, such that the first contribution, at a given wavenumber, is given by the nominal phase shift at a shifted wavenumber that is obtained by shifting the given wavenumber by the wavenumber shift.

4. The method according to claim 1, further comprising:
    determining a total optical path difference that is caused by local deformation of the dielectric coating based on the first measurement of phase shift at the first wavenumber, the second measurement of phase shift at the second wavenumber, and the nominal phase shift.

5. The method according to claim 4, wherein the phase shift as the function of wavenumber is determined further based on the total optical path difference.

6. The method according to claim 1, further comprising:
    determining a total optical path difference that is caused by local deformation of the dielectric coating based on the first measurement of phase shift at the first wavenumber, the second measurement of phase shift at the second wavenumber, and the nominal phase shift,
    wherein determining the second contribution involves obtaining a product of the total optical path difference and the wavenumber.

7. The method according to claim 1, wherein the first and second wavenumbers are determined such that they satisfy $$\frac{R(k_1)}{k_1} = \frac{R(k_2)}{k_2},$$

where $k_1$ and $k_2$ are the first and second wavenumbers, respectively, and $R(k)$ includes higher order terms of second order or higher of a Taylor expansion of the nominal phase shift at wavenumber $k$.

8. The method according to claim 1, wherein the wavenumber shift is determined as $$\delta k = \frac{k_2 \cdot k_1 \cdot (OPD_2 - OPD_1) - (k_1 \cdot \phi_c(k_2) - k_2 \cdot \phi_c(k_1))}{k_1 \cdot \frac{d\phi_c}{dk}(k_2) - k_2 \cdot \frac{d\phi_c}{dk}(k_1)},$$

where $\delta k$ is the wavenumber shift, $k_1$ and $k_2$ are the first and second wavenumbers, respectively, $OPD_1$ and $OPD_2$ are optical path differences obtained in the first and second measurements, respectively, and $\phi_c(k)$ is the nominal phase shift as the function of wavenumber.

9. The method according to claim 1, wherein the steps of determining the wavenumber shift and determining the phase shift as the function of wavenumber are performed for each of a plurality of points on a surface of the dielectric coating.

10. The method according to claim 1, wherein the steps of determining the wavenumber shift and determining the phase shift as the function of wavenumber are performed for each of a plurality of angles of incidence at the dielectric coating.

11. The method according to claim 1, further comprising determining a phase shift at a third wavenumber that is different from both the first and second wavenumbers, based on the phase shift as the function of wavenumber and the third wavenumber.

12. The method according to claim 11, further comprising:
 obtaining a measured wave front after reflection by, or transmission through, the dielectric coating at the third wavenumber; and
 determining a final output indicative of or depending on the measured wave front, based on the determined phase shift at the third wavenumber.

13. The method according to claim 1, further comprising performing the first measurement of phase shift at the first wavenumber and the second measurement of phase shift at the second wavenumber.

14. The method according to claim 1, further comprising:
 obtaining design information relating to the dielectric coating; and
 determining the nominal phase shift for the dielectric coating as the function of wavenumber based on the design information.

15. The method according to claim 14, wherein the dielectric coating comprises a plurality of stacked layers, and
 wherein the design information includes a total optical thickness of the dielectric coating.

16. The method according to claim 1, wherein the dielectric coating comprises a plurality of stacked layers.

17. The method according to claim 1, wherein the phase shift is further a function of an angle of incidence at the dielectric coating.

18. The method according to claim 1, further comprising:
 obtaining a result of a fourth measurement of-a the wave front after reflection by, or transmission through, the dielectric coating at a fourth wavenumber, the fourth wavenumber being different from the first and second wavenumbers; and
 reconstructing the wave front after reflection by, or transmission through, the dielectric coating at the fourth wavenumber using the determined wavenumber shift and the nominal phase shift; and
 correcting the determined wavenumber shift based on a comparison of the measured and reconstructed wave fronts at the fourth wavenumber.

19. An apparatus for determining a phase shift caused by reflection at, or transmission through, a dielectric coating as a function of wavenumber, the apparatus comprising one or more processors adapted to perform the method of claim 1.

20. A non-transitory computer-readable storage medium storing a computer-executable program that, when executed by one or more processors, causes the one or more processors to perform the method of claim 1.

* * * * *